(12) United States Patent
Wei et al.

(10) Patent No.: US 10,731,408 B2
(45) Date of Patent: Aug. 4, 2020

(54) WINDOW COVERING SYSTEM AND DISPLACEMENT CONTROLLING DEVICE THEREOF

(71) Applicant: Nien Made Enterprise Co., Ltd., Taichung (TW)

(72) Inventors: Shui-Dong Wei, TaiChung (TW); Keng-Hao Nien, TaiChung (TW)

(73) Assignee: NIEN MADE ENTERPRISE CO., LTD., Taichung (TW)

(*) Notice: Subject to any disclaimer, the term of this patent is extended or adjusted under 35 U.S.C. 154(b) by 214 days.

(21) Appl. No.: 15/407,219

(22) Filed: Jan. 16, 2017

(65) Prior Publication Data

US 2017/0218703 A1    Aug. 3, 2017

Related U.S. Application Data

(60) Provisional application No. 62/326,020, filed on Apr. 22, 2016, provisional application No. 62/318,771, filed on Apr. 6, 2016.

(30) Foreign Application Priority Data

Jan. 29, 2016 (CN) .................... 2016 2 0093383 U

(51) Int. Cl.
*E06B 9/322* (2006.01)
*E06B 9/34* (2006.01)
(Continued)

(52) U.S. Cl.
CPC .............. *E06B 9/322* (2013.01); *E06B 9/304* (2013.01); *E06B 9/307* (2013.01); *E06B 9/34* (2013.01);
(Continued)

(58) Field of Classification Search
CPC ... E06B 9/322; E06B 9/34; E06B 9/40; E06B 9/42; E06B 9/32; E06B 9/60; E06B 2009/807
(Continued)

(56) References Cited

U.S. PATENT DOCUMENTS 3,965,960 A * 6/1976 Massey .................... A47K 3/38
160/295
4,427,050 A * 1/1984 Toppen ..................... E06B 9/60
160/315
(Continued)

FOREIGN PATENT DOCUMENTS

AU         782302 B2     7/2005
AU     2012370499 A1     9/2014
(Continued)

OTHER PUBLICATIONS

Fan, English Translation of "CN 2544644 Y" obtained from <https://worldwide.espacenet.com> (Year: 2003).*

*Primary Examiner* — Johnnie A. Shablack
(74) *Attorney, Agent, or Firm* — Muncy, Geissler, Olds & Lowe, P.C.

(57) ABSTRACT

A displacement controlling device comprises a shaft having a displacement region, a movable unit connected to the shaft and configured to move within the displacement region, a damper connected to one end of the shaft, and a restraint unit arranged between the movable unit and the damper, wherein the restraint unit is configured to be driven by the movable unit from a first position toward a second position; the damper outputs a resistance when the restraint unit is at the first position, and the damper stops outputting the resistance if the restraint unit is at the second position.

14 Claims, 24 Drawing Sheets

(51) Int. Cl.
*F16H 19/06* (2006.01)
*F16H 29/12* (2006.01)
*E06B 9/304* (2006.01)
*E06B 9/307* (2006.01)
*E06B 9/388* (2006.01)
*E06B 9/80* (2006.01)

(52) U.S. Cl.
CPC ............ *F16H 19/06* (2013.01); *F16H 29/12* (2013.01); *E06B 9/388* (2013.01); *E06B 2009/807* (2013.01)

(58) Field of Classification Search
USPC ............ 160/296, 294, 295, 299, 305, 293.1
See application file for complete search history.

(56) References Cited

U.S. PATENT DOCUMENTS

| | | | | |
|---|---|---|---|---|
| 4,429,729 | A * | 2/1984 | Winslow | E06B 9/60 144/193.1 |
| 4,466,475 | A * | 8/1984 | Saito | E06B 9/90 160/297 |
| 4,498,517 | A * | 2/1985 | Mase | E06B 9/82 160/294 |
| 4,513,805 | A * | 4/1985 | Mase | E06B 9/80 160/299 |
| 4,523,620 | A * | 6/1985 | Mortellite | E06B 9/60 160/315 |
| 4,681,279 | A | 7/1987 | Nakamura | |
| 5,078,198 | A * | 1/1992 | Tedeschi | E06B 9/60 160/301 |
| 5,123,472 | A | 6/1992 | Nagashima et al. | |
| 5,167,269 | A * | 12/1992 | Abo | E06B 9/90 160/305 |
| 5,437,324 | A * | 8/1995 | Sternquist | E06B 9/44 160/299 |
| 6,129,131 | A | 10/2000 | Colson | |
| 6,155,328 | A | 12/2000 | Welfonder | |
| 6,332,491 | B1 | 12/2001 | Rossini | |
| 6,378,594 | B1 * | 4/2002 | Yamanaka | E06B 9/80 160/238 |
| 6,467,714 | B1 * | 10/2002 | Rasmussen | E06B 9/44 160/296 |
| 6,666,252 | B2 * | 12/2003 | Welfonder | E06B 9/42 160/296 |
| 6,715,528 | B2 | 4/2004 | Rossini | |
| 6,749,142 | B2 * | 6/2004 | Arisaka | B60R 5/047 160/296 |
| 6,938,667 | B2 * | 9/2005 | Sugiyama | E06B 9/54 160/296 |
| 6,948,544 | B2 | 9/2005 | Nien | |
| 6,955,207 | B2 | 10/2005 | Minder | |
| 7,198,089 | B2 | 4/2007 | Hsu | |
| 7,234,503 | B2 * | 6/2007 | Kwak | E06B 9/42 160/295 |
| 7,331,370 | B1 * | 2/2008 | Militello | E06B 9/322 160/170 |
| 7,341,091 | B2 | 3/2008 | Nien et al. | |
| 7,406,995 | B2 | 8/2008 | Huang | |
| 7,461,683 | B2 * | 12/2008 | Wang | E06B 9/44 160/291 |
| 7,549,458 | B2 * | 6/2009 | Kwak | E06B 9/42 160/319 |
| 7,578,334 | B2 | 8/2009 | Smith et al. | |
| 7,717,154 | B2 | 5/2010 | Cheng | |
| 8,051,960 | B2 * | 11/2011 | Nakajima | E06B 9/80 160/299 |
| 8,210,230 | B2 * | 7/2012 | Glasl | B60J 1/2033 160/313 |
| 8,230,896 | B2 | 7/2012 | Anderson | |
| 8,267,145 | B2 | 9/2012 | Fraser et al. | |
| 8,281,846 | B2 * | 10/2012 | Zhu | E06B 9/42 160/168.1 R |
| 8,517,081 | B2 * | 8/2013 | Huang | E06B 9/60 160/294 |
| 8,556,204 | B2 * | 10/2013 | Kao | E06B 9/42 242/381 |
| 8,746,320 | B2 * | 6/2014 | Yu | E06B 9/322 160/170 |
| 9,062,492 | B2 | 6/2015 | Yu | |
| 9,062,494 | B2 * | 6/2015 | Chen | E06B 9/60 |
| 9,080,381 | B2 * | 7/2015 | Haarer | E06B 9/42 |
| 9,127,500 | B2 | 9/2015 | Huang | |
| 9,194,176 | B2 * | 11/2015 | Chen | E06B 9/42 |
| 9,284,774 | B2 | 3/2016 | Yu et al. | |
| 9,322,214 | B2 * | 4/2016 | Bohlen | E06B 9/88 |
| 9,341,020 | B1 * | 5/2016 | Kao | E06B 9/262 |
| 9,593,530 | B1 * | 3/2017 | Anthony | E06B 9/80 |
| 9,617,787 | B2 * | 4/2017 | Bohlen | E06B 9/42 |
| 9,631,425 | B2 * | 4/2017 | Campagna | E06B 9/60 |
| 9,689,202 | B2 * | 6/2017 | Lin | B60J 1/2033 |
| 9,702,187 | B2 * | 7/2017 | Holt | E06B 9/262 |
| 9,739,089 | B2 * | 8/2017 | Smith | E06B 9/60 |
| 9,816,317 | B2 * | 11/2017 | Chen | E06B 9/42 |
| 9,879,479 | B2 * | 1/2018 | Haarer | E06B 9/42 |
| 10,138,676 | B2 * | 11/2018 | Bohlen | E06B 9/62 |
| 10,364,602 | B2 * | 7/2019 | Kwak | E06B 9/42 |
| 10,451,145 | B2 * | 10/2019 | Chen | E06B 9/307 |
| 10,487,573 | B2 * | 11/2019 | Bohlen | E06B 9/42 |
| 10,501,988 | B2 * | 12/2019 | Fisher | E06B 9/50 |
| 2006/0000561 | A1 * | 1/2006 | Anderson | E06B 9/262 160/168.1 R |
| 2008/0190572 | A1 * | 8/2008 | Kwak | E06B 9/42 160/313 |
| 2009/0078380 | A1 | 3/2009 | Cheng | |
| 2009/0120592 | A1 | 5/2009 | Lesperance | |
| 2010/0212843 | A1 * | 8/2010 | Bohlen | E06B 9/88 160/168.1 R |
| 2011/0005694 | A1 * | 1/2011 | Ng | E06B 9/44 160/311 |
| 2011/0024064 | A1 * | 2/2011 | Ng | E06B 9/42 160/317 |
| 2011/0290429 | A1 | 12/2011 | Cheng | |
| 2013/0037225 | A1 * | 2/2013 | Huang | E06B 9/60 160/313 |
| 2013/0087415 | A1 | 4/2013 | Hsieh | |
| 2014/0083631 | A1 | 3/2014 | Huang | |
| 2014/0131502 | A1 | 5/2014 | Zhu | |
| 2014/0291431 | A1 | 10/2014 | Huang | |
| 2015/0059992 | A1 | 3/2015 | Liu | |
| 2015/0136336 | A1 * | 5/2015 | Huang | E06B 9/322 160/170 |
| 2015/0211296 | A1 | 7/2015 | Zhang et al. | |
| 2015/0285000 | A1 * | 10/2015 | Liu | E06B 9/80 242/396 |
| 2015/0354275 | A1 | 12/2015 | Huang et al. | |
| 2015/0368968 | A1 | 12/2015 | Smith | |
| 2015/0376941 | A1 * | 12/2015 | Fujita | E06B 9/26 160/241 |
| 2016/0130866 | A1 * | 5/2016 | Buccola, Jr. | E06B 9/322 185/9 |
| 2017/0107760 | A1 * | 4/2017 | Campagna | E06B 9/60 |
| 2017/0138123 | A1 * | 5/2017 | Chen | E06B 9/304 |
| 2017/0175440 | A1 * | 6/2017 | Bohlen | E06B 9/42 |
| 2017/0211657 | A1 * | 7/2017 | Chen | E06B 9/322 |
| 2017/0218703 | A1 * | 8/2017 | Wei | E06B 9/34 |
| 2017/0298691 | A1 * | 10/2017 | Yamagishi | E06B 9/304 |
| 2018/0106107 | A1 * | 4/2018 | Smith | E06B 9/42 |
| 2018/0179812 | A1 * | 6/2018 | Dubina | E06B 9/42 |
| 2018/0179814 | A1 * | 6/2018 | Kwak | E06B 9/42 |
| 2019/0257146 | A1 * | 8/2019 | Norton | E06B 9/42 |

FOREIGN PATENT DOCUMENTS

| | | |
|---|---|---|
| CA | 2805798 A1 | 8/2014 |
| CN | 2544644 Y | 4/2003 |
| CN | 1720384 A | 1/2006 |
| CN | 1780970 A | 5/2006 |
| CN | 101021139 B | 7/2010 |
| CN | 201981989 U | 9/2011 |
| CN | 204552565 U | 8/2015 |

(56) References Cited

FOREIGN PATENT DOCUMENTS

| | | |
|---|---|---|
| DE | 202007002787 U1 | 7/2008 |
| JP | H04250287 A | 9/1992 |
| JP | 1993018168 A | 1/1993 |
| JP | 2000145328 A | 5/2000 |
| JP | 2000220369 A | 8/2000 |
| JP | 3261106 B2 | 2/2002 |
| JP | 3378813 B2 | 2/2003 |
| JP | 3442670 B2 | 9/2003 |
| JP | 3485164 B2 | 1/2004 |
| JP | 2008013950 A | 1/2008 |
| JP | 4074420 B2 | 4/2008 |
| JP | 2013072183 A | 4/2013 |
| JP | 2013072224 A | 4/2013 |
| JP | 2013217139 A | 10/2013 |
| JP | 2015161147 A | 9/2015 |
| JP | 2015180810 A | 10/2015 |
| TW | I246415 B | 1/2006 |
| TW | M305849 U | 2/2007 |
| TW | I463961 B | 12/2014 |
| WO | 2010125951 A1 | 11/2010 |
| WO | 2016009881 A1 | 1/2016 |

* cited by examiner

WINDOW COVERING SYSTEM AND DISPLACEMENT CONTROLLING DEVICE THEREOF

CROSS-REFERENCE TO RELATED APPLICATIONS

This application claims benefit of priority to U.S. Provisional Application Ser. No. 62/318,771, filed Apr. 6, 2016. This application also claims benefit of priority to U.S. Provisional Application Ser. No. 62/326,020, filed Apr. 22, 2016. This application also claims benefit of priority to CN Utility Model Application Ser. No. 201620093383.6, filed Jan. 29, 2016.

BACKGROUND

1. Technical Field

The present disclosure relates to a window covering system having a displacement controlling device, and particularly to a displacement controlling device which can output or stop outputting a resistance according to a displacement of a movable unit on a shaft of the displacement controlling device.

2. Description of Related Art

In general, vertical lift window covering systems determine a shading range by collecting or expanding a covering material of the window covering systems. According to different structures or appearance of the covering material, the window covering systems can be a blind, a cellular shade, a roller shade or a sheer shade. A covering material of the blind has a plurality of long-plate slats parallel to one another in the same direction to determine a range of light passing through by downwardly expanding or upwardly stacking the slats, and the blind determines how much light passing through the covering material by adjusting an angle of the slats. A covering material of the cellular shade provides a front sheet, a back sheet, a plurality of tunnels formed between the front sheet and the back sheet, wherein the tunnels stack to each other and have a cellular appearance from a side view of the covering material of the cellular shade. The roller shade collects the covering material by a shaft tube and determines a range of the shading light by controlling how much covering material is rolled up by the shaft tube, and thus the covering material has a roll shape when raised and a sheet shape when expanded. The sheer shade is similar to the roller shade such that the sheer shade rolls the covering material onto the shaft tube. However, the sheer shade provides a front sheet, a back sheet, and a plurality of connecting sheets parallel to one another between the front sheet and the back sheet. When the covering material is collected, the shaft tube is driven to dislocate at least one of the front sheet and the back sheet such that the connecting sheets become vertically oriented. Thus, the front sheet, the back sheet, and the connecting sheets are closed to one another and substantially present a sheet shape to be rolled onto the shaft tube. When the covering material is expanded, the shaft tube is driven to adjust the dislocation between the front sheet and the back sheet, thus changing an angle of the connecting sheets to control light passing through the covering material.

Operation of the conventional window covering system can be distinguished by different operation modules, such as cord operation, cordloop operation, and single cord operation. A window covering system with cord operation includes a headrail, a bottom rail, and a covering material arranged between the headrail and the bottom rail. A cord between the headrail and the bottom rail is usually called a lift cord; a rope expands out of the headrail for user operation is usually called an operation rope, wherein the operation rope is used to ascend or descend the bottom rail so as to change a range of light passing through the covering material. A window covering system with cordloop operation includes a cordloop expanding out of the headrail, wherein the cordloop is pulled clockwise or anti clockwise for ascending or descending the bottom rail and a final position of the bottom rail. The window covering system with cordloop operation usually had a rotatable shaft tube or shaft, wherein the shaft tube or shaft is rotated by pulling the cordloop for collecting or expanding the covering material or collecting or releasing the lift cord in order to collect or expand the covering material. A window covering system with single cord operation includes a single operation cord expanding out of the headrail, and the single operation cord is further distinguished into two types, retractable single cord and non-retractable single cord. Operation of the non-retractable single cord is the same as the operation rope, whereas the retractable single cord is pulled and released repeatedly for collecting the covering material.

However, most of users collect the window covering system for letting light passing through according to the users' usage habit. Therefore, the users need to manually operate throughout the process of covering material extension in order to control a stopping position of the bottom rail precisely, and thus defines a range of the light passing through. Extension of the covering material is used for shading the light. Therefore, the bottom rail is usually dropped to the lowest point for fully expanding the covering material such that the light is blocked. Furthermore, in a process of dropping the bottom rail by window covering systems with different kinds of lift cords, the covering material is expanded rapidly due to a downward force generated from the gravity which acts upon the covering material, and thus the covering material collides with the bottom rail or surroundings of the window covering system and causes damage. To avoid the damage, the user has to manually operate the lift cords throughout the process of dropping the bottom rail in order to stabilize the expanding speed of the covering material. However, it is inconvenient and a waste of time for the user, if manual operation of the lift cord for controlling the dropping speed of the bottom rail during extension of the covering material is needed throughout the process. In addition, different usage habit from different users can also cause damage to any mechanical parts within the window covering system. Accordingly, operational inconvenience due to rapid extension of the covering material or potential risk of damaging the mechanical parts should be avoid during expanding the covering material regardless of the type of the window covering system, and therefore improvement of the window covering system is needed.

SUMMARY

In view of the above, the present disclosure provides a displacement controlling device for controlling a window covering system and a window covering system having the same.

The present disclosure provides a displacement controlling device comprising a shaft having a displacement region, a movable unit connected to the shaft and configured to move within the displacement region, a damper connected to one end of the shaft, and a restraint unit arranged between the movable unit and the damper, wherein the restraint unit is configured to be driven by the movable unit from a first position toward a second position, wherein the damper outputs a resistance when the restraint unit is at the first position, and wherein the damper stops outputting the resistance if the restraint unit is at the second position.

The present disclosure further provides a window covering system, comprising a headrail, a bottom rail, a covering material between the headrail and the bottom rail, a driving module arranged in the headrail and configured to expand or collect the covering material, and an operation module configured for driving the driving module. The window covering system further comprises a displacement controlling device arranged in the headrail. The displacement controlling device comprises a shaft having a displacement region and connected to the driving module, wherein the shaft is configured to operate simultaneously with the driving module; a movable unit connected to the shaft and configured to move within the displacement region; a damper connected to one end of the shaft; and a restraint unit arranged between the movable unit and the damper, wherein the restraint unit is configured to be driven by the movable unit from a first position to a second position. When the covering material starts expanding, the restraint unit is at the first position, whereby the damper is configured to output a resistance. While the covering material is expanding, the restraint unit is configured to move from the first position to the second position, whereby the damper is configured to stop outputting the resistance as the restraint unit reaches the second position.

The present disclosure further provides a window covering system comprising a covering material, a shaft tube configured to collect or expand the covering material, and an operation module configured to drive the shaft tube to rotate. The window covering system further comprises a displacement controlling device arranged in the shaft tube. The displacement controlling device comprises a shaft arranged in the shaft tube and having a displacement region; a movable unit connected to the shaft and configured to rotate by the shaft tube and move within the displacement region; a damper connected to one end of the shaft; and a restraint unit arranged between the movable unit and the damper, wherein the restraint unit is configured to be driven by the movable unit from a first position toward a second position. When the covering material is completely collected, the restraint unit is at the second position. While the covering material is expanding, the restraint unit is configured to move from the second position to the first position, whereby the damper is configured to output a resistance as the restraint unit reaches the first position.

Compared to conventional designs, the displacement controlling device and the window covering system of the present disclosure may effectively control the expansion of the covering material.

BRIEF DESCRIPTION OF THE DRAWINGS

The above and other aspects of the disclosure are described below in conjunction with the following drawings.

DETAILED DESCRIPTION

Figure 1:
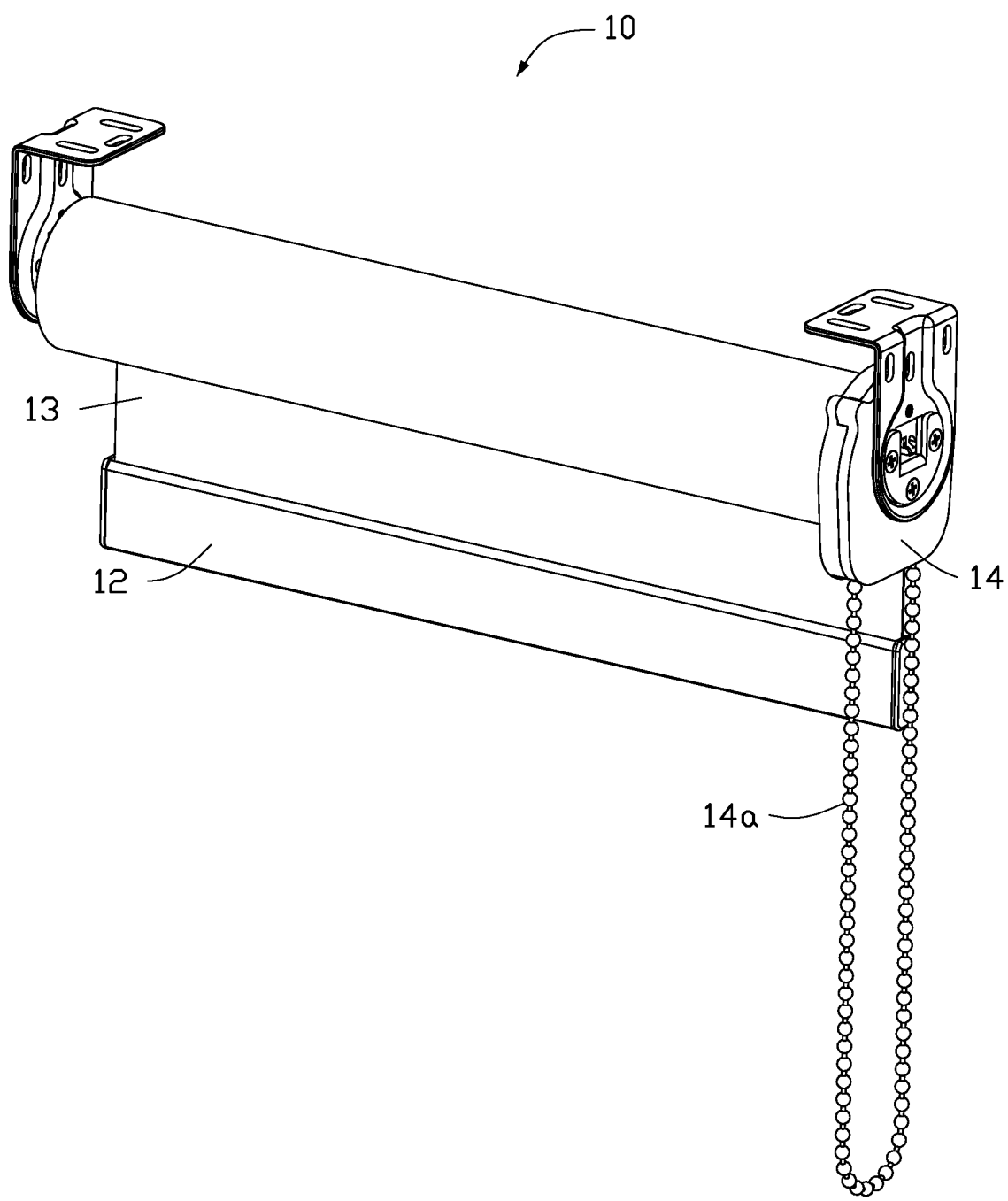
FIG. 1 is a perspective view of a window covering system according to one embodiment of the present disclosure.
Figure 2:
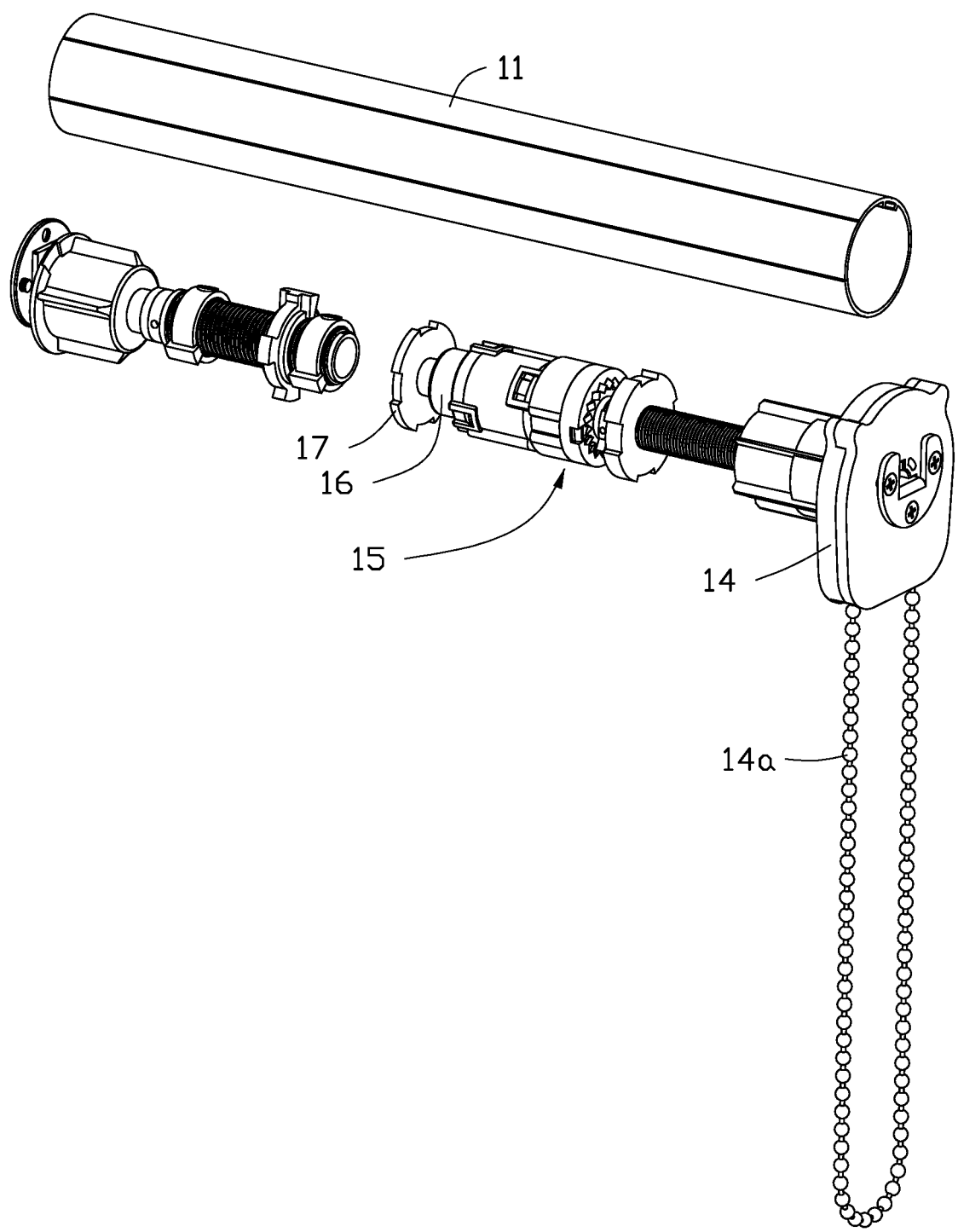
FIG. 2 is a partial perspective view of the window covering system according to one embodiment of the present disclosure.
Figure 3:
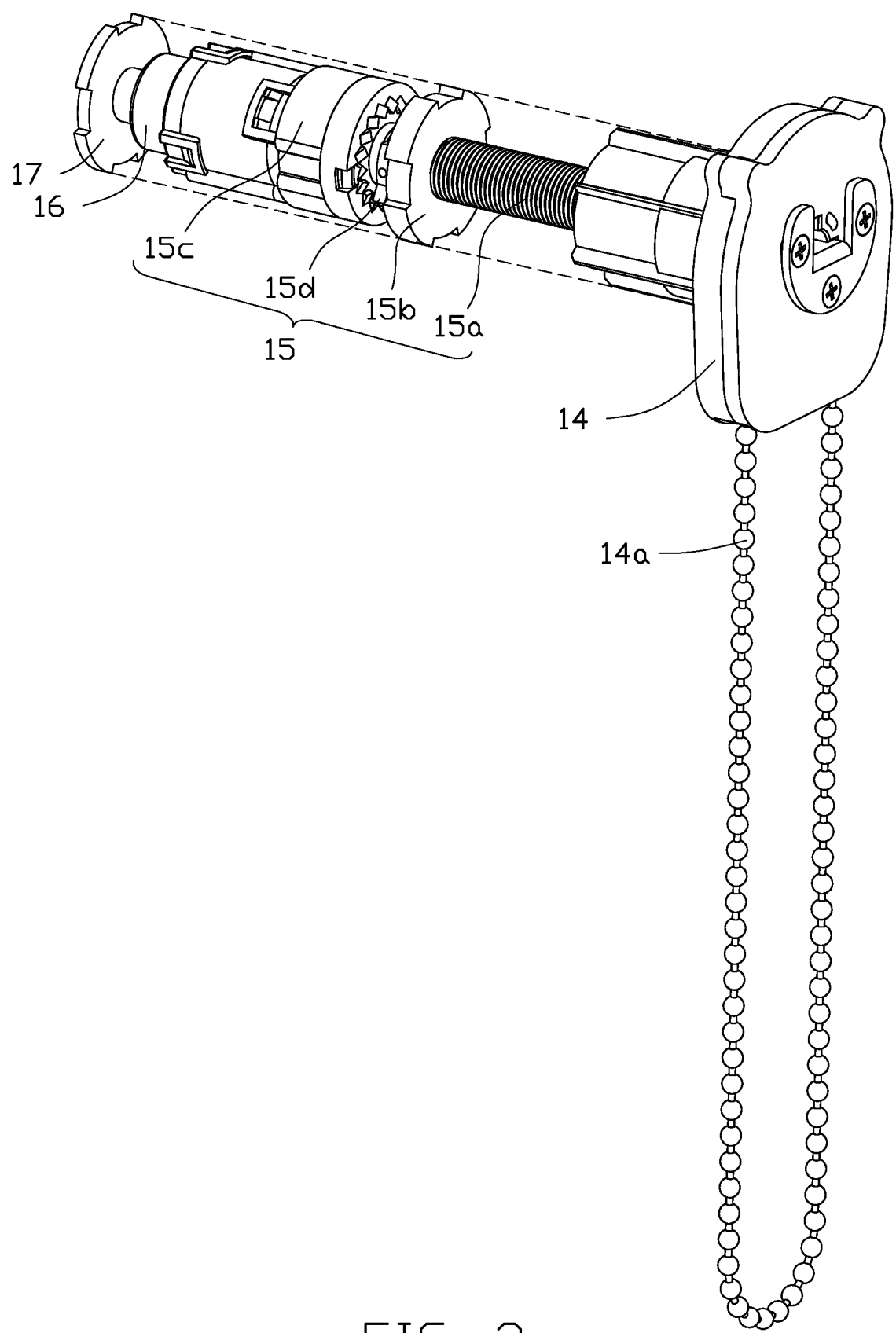
FIG. 3 is a perspective view of the window covering system according to one embodiment of the present disclosure, illustrating a restraint unit of the window covering system such that the restraint unit is arranged at a second position.
Figure 4:
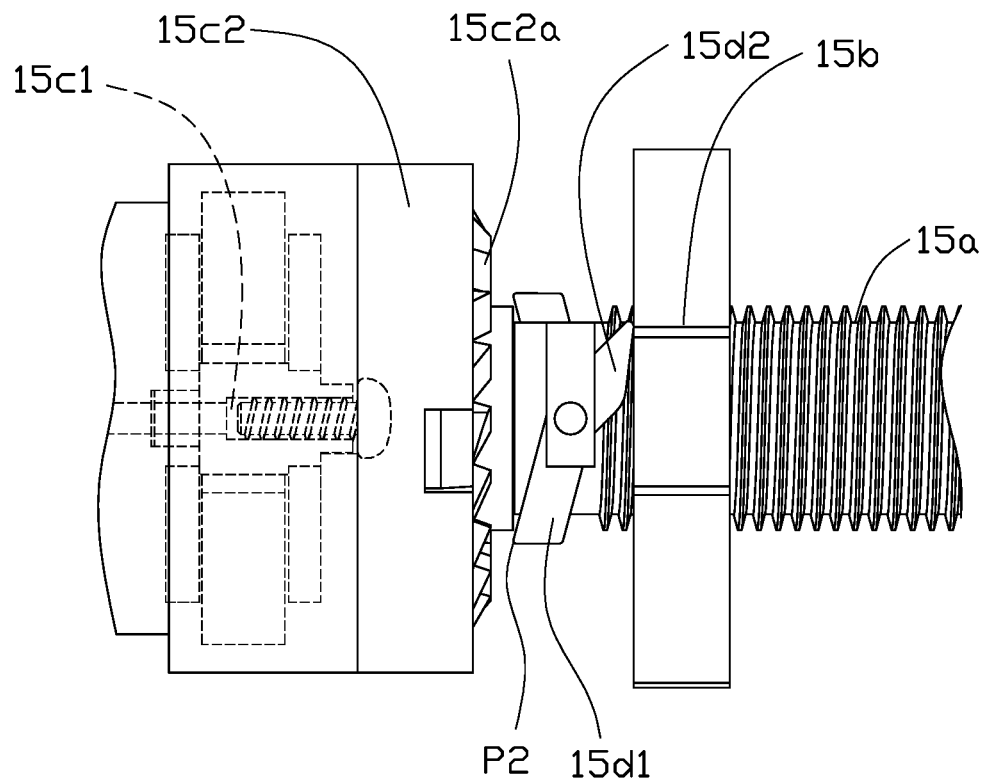
FIG. 4 is a partial cross-section view of FIG. 3.

The present disclosure will now be described more fully hereinafter with reference to the accompanying drawings, in which exemplary embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. Like reference numerals refer to like elements throughout.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

It will be understood that the term "and/or" includes any and all combinations of one or more of the associated listed items. It will also be understood that, although the terms first, second, third etc. may be used herein to describe various elements, components, regions, parts and/or sections, these elements, components, regions, parts and/or sections should not be limited by these terms. These terms are only used to distinguish one element, component, region, part or section from another element, component, region, layer or section. Thus, a first element, component, region, part or section discussed below could be termed a second element, component, region, layer or section without departing from the teachings of the present disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The description will be made as to the embodiments of the present disclosure in conjunction with the accompanying drawings in FIGS. 1 to 24. Reference will be made to the drawing figures to describe the present disclosure in detail, wherein depicted elements are not necessarily shown to scale and wherein like or similar elements are designated by same or similar reference numeral through the several views and same or similar terminology.

FIGS. 1-5 are a one embodiment of a window covering system 10 of the present disclosure, wherein the window covering system 10 is exemplified by a roller shade. The window covering system 10 comprises a shaft tube 11, a bottom rail 12, a covering material 13, an operation module 14, a displacement controlling device 15, and a one-way clutch 16. The operation module 14 is fixed to one end of the shaft tube 11 to drive the shaft tube 11. A surface of the shaft tube 11 is connected to a top end of the covering material 13, so that the covering material 13 can be rolled upon the shaft tube 11 when the shaft tube 11 is rotating. A bottom end of the covering material 13 is connected to the bottom rail 12 so that a weight of the bottom rail 12 generates a downward force to expand the covering material 13, wherein the shaft tube 11 rotates when the covering material 13 is expanded by the downward force. The displacement controlling device 15 and the one-way clutch 16 are arranged in the shaft tube 11, wherein one end of the displacement controlling device 15 is connected to the one-way clutch 16.

The displacement controlling device 15 further comprises a shaft, a movable unit, a damper, and a restraint unit. The shaft is arranged in the shaft tube 11. The movable unit is sleeved over the shaft and has a displacement region around the shaft. The damper is fixed to one end of the shaft. The restraint unit is arranged between the movable unit and the damper.

In one embodiment of the present disclosure, the shaft may be a threaded rod 15a which has a long rod body, the movable unit may be a nut 15b which is sleeved over the threaded rod 15a, one end of the threaded rod 15a is connected to the damper 15c, and the restraint unit may be a pivot latch 15d which is set pivotally to the threaded rod 15a. Another end of the threaded rod 15a is connected to the operation module 14 arranged at one end of the shaft tube 11 such that fixed the threaded rod 15a in the shaft tube 11. The nut 15b is connected to the threaded rod 15a by a threaded engagement. An outer surface of the nut 15b engages to an inner surface of the shaft tube 11 so that the nut 15b rotates simultaneously with the shaft tube 11 and moves along the threaded rod 15a in an axial direction of the threaded rod 15a. The pivot latch 15d is arranged at one end of the threaded rod 15a such that the pivot latch 15d is adjacent to the damper 15c. The pivot latch 15d has two end, one end is a latch part 15d1 and another end is a blocking part 15d2.

Figure 5:
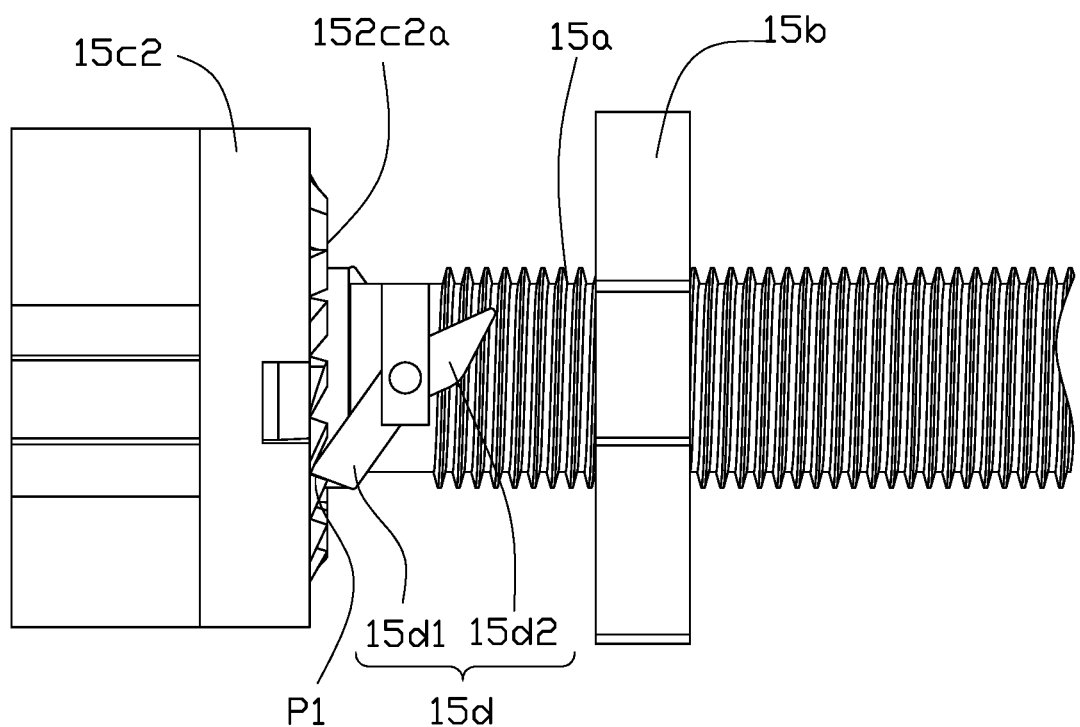
FIG. 5 is a front view of the window covering system according to one embodiment of the present disclosure, illustrating a restraint unit of the window covering system such that the restraint unit is arranged at a first position.
Figure 6:
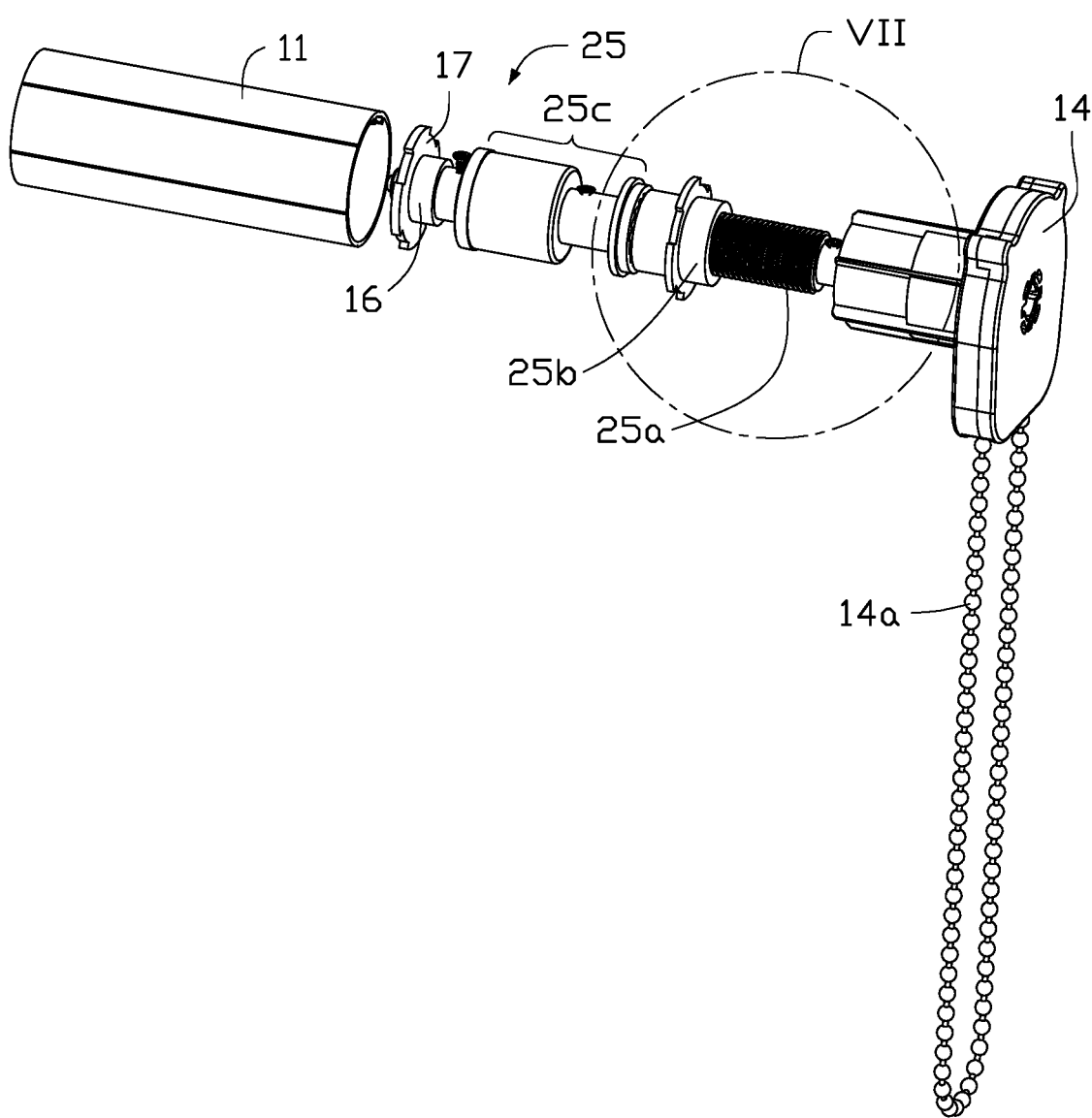
FIG. 6 is a partial perspective view of a window covering system according to another embodiment of the present disclosure.
Figure 7:
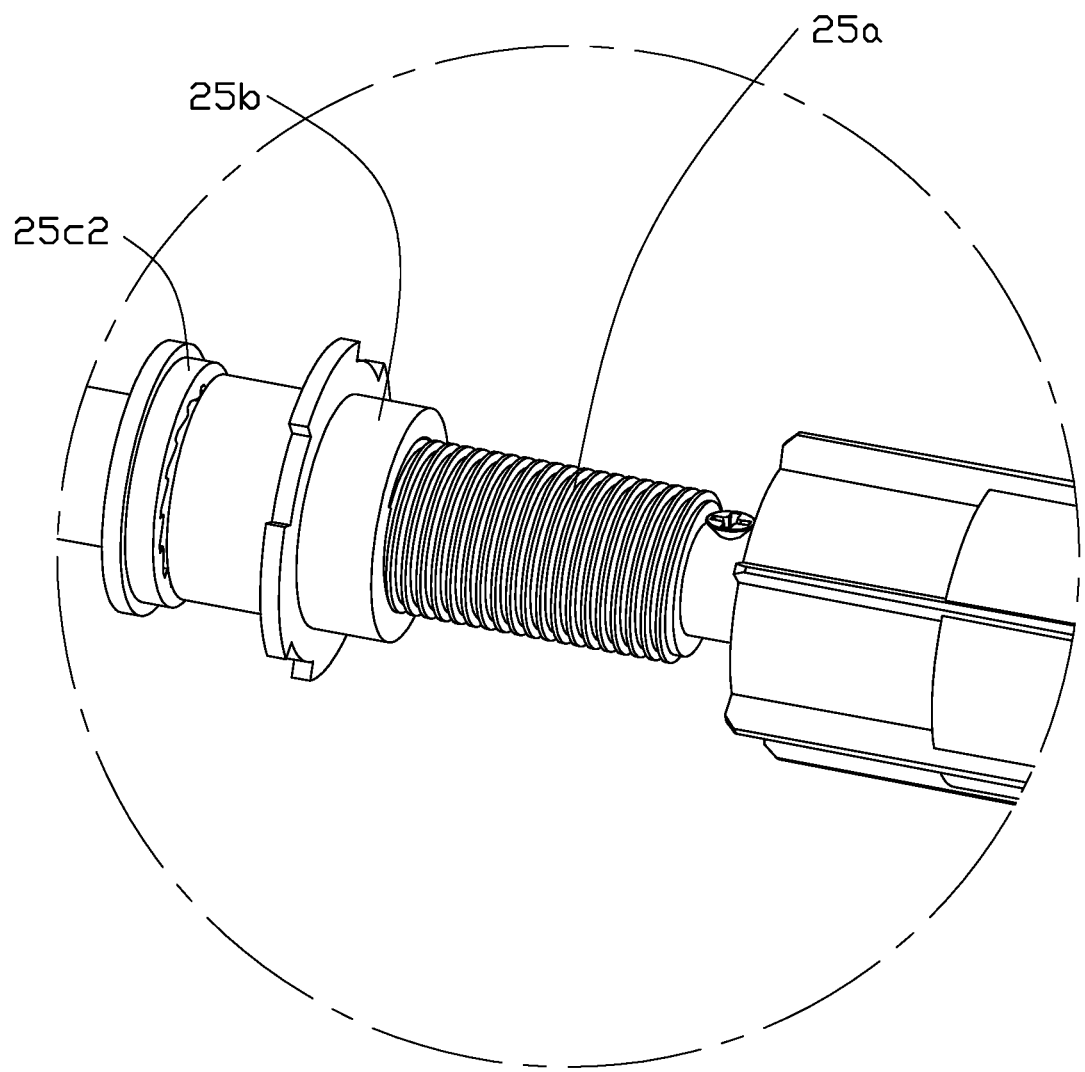
FIG. 7 is a partial perspective view of the window covering system according to one embodiment of the present disclosure, illustrating a restraint unit of the window covering system such that the restraint unit is arranged at a second position.
Figure 8:
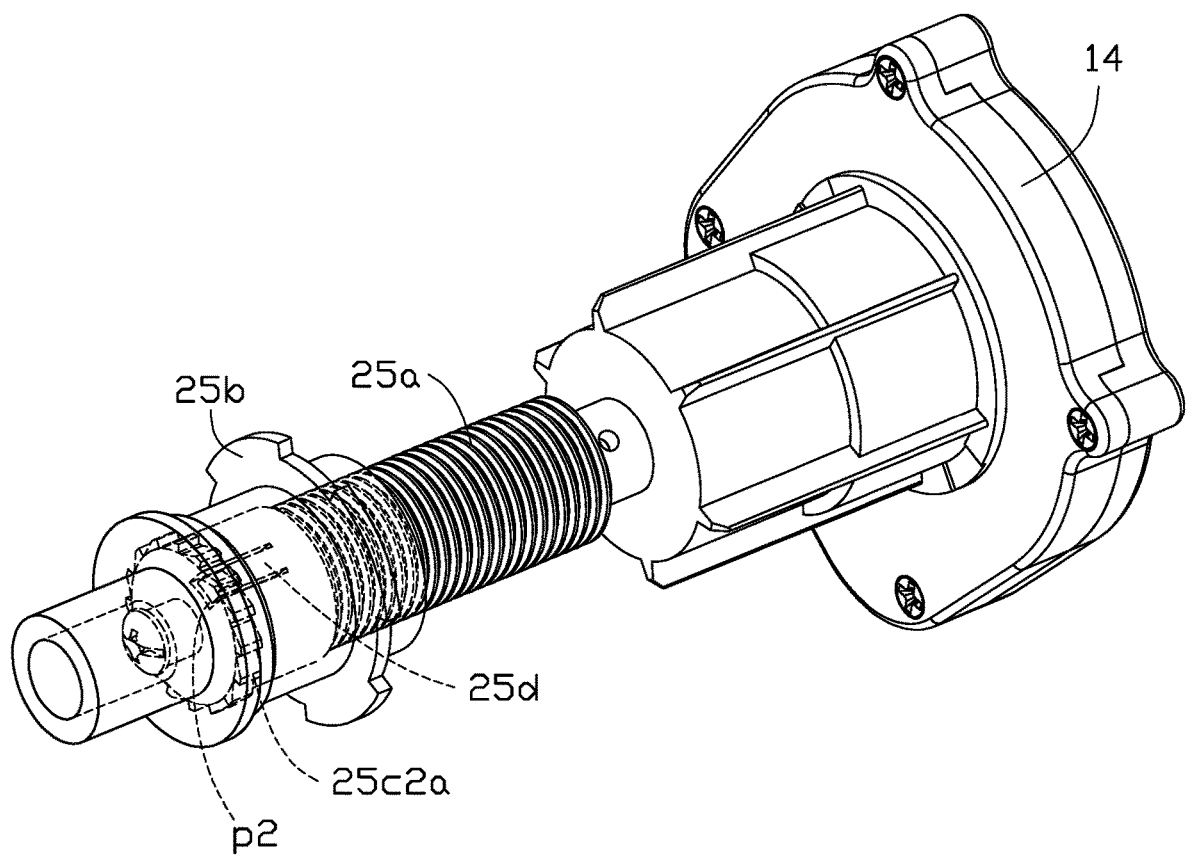
FIG. 8 is a perspective view of the window covering system according to one embodiment of the present disclosure, illustrating the restraint unit of the window covering system such that the restraint unit is arranged at the second position.
Figure 9:
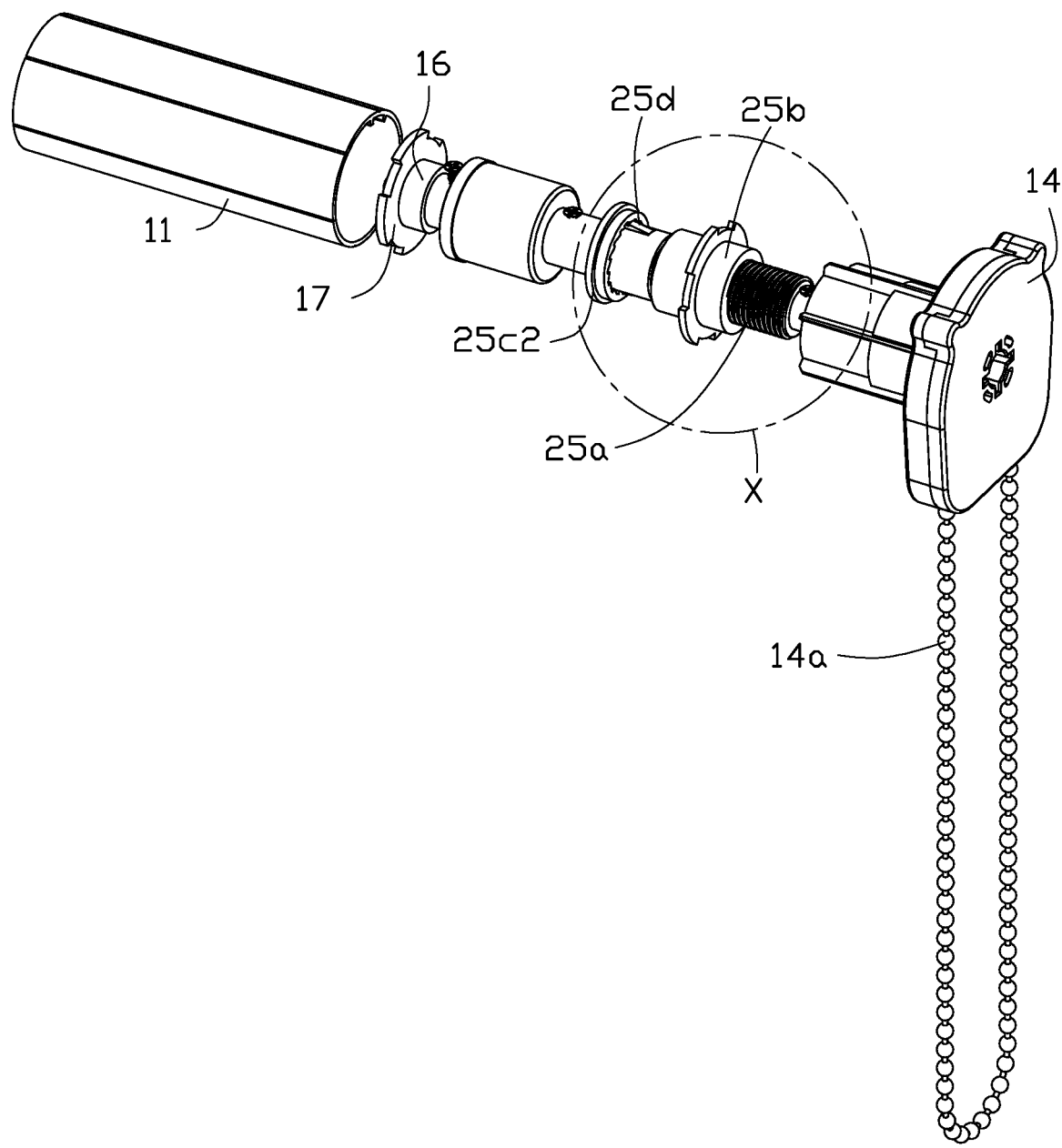
FIG. 9 is a partial perspective view of the window covering system according to one embodiment of the present disclosure, illustrating the restraint unit of the window covering system such that the restraint unit is arranged at a first position.
Figure 10:
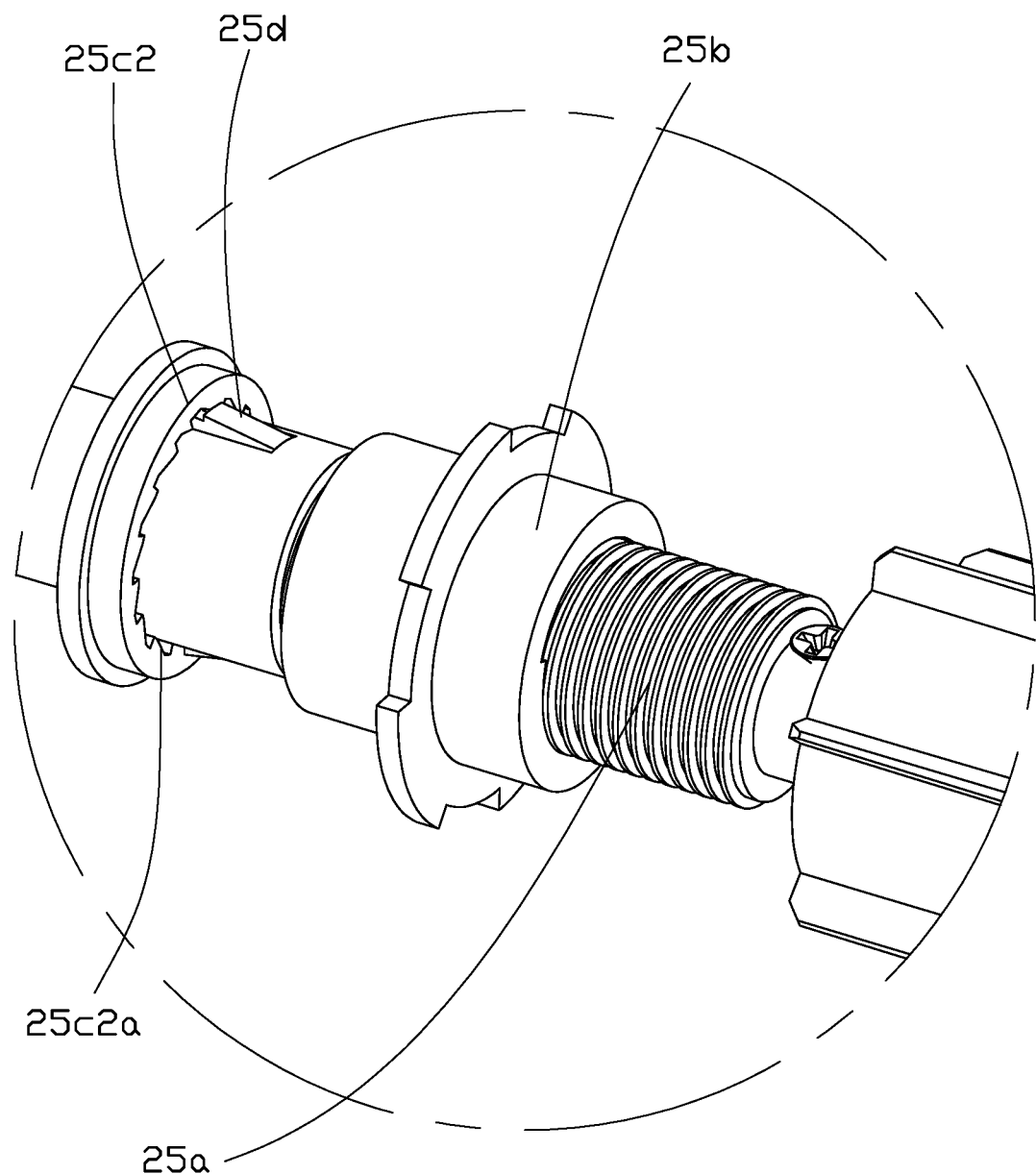
FIG. 10 is a perspective view of the window covering system according to one embodiment of the present disclosure, illustrating the restraint unit of the window covering system such that the restraint unit is arranged at the first position.
Figure 11:
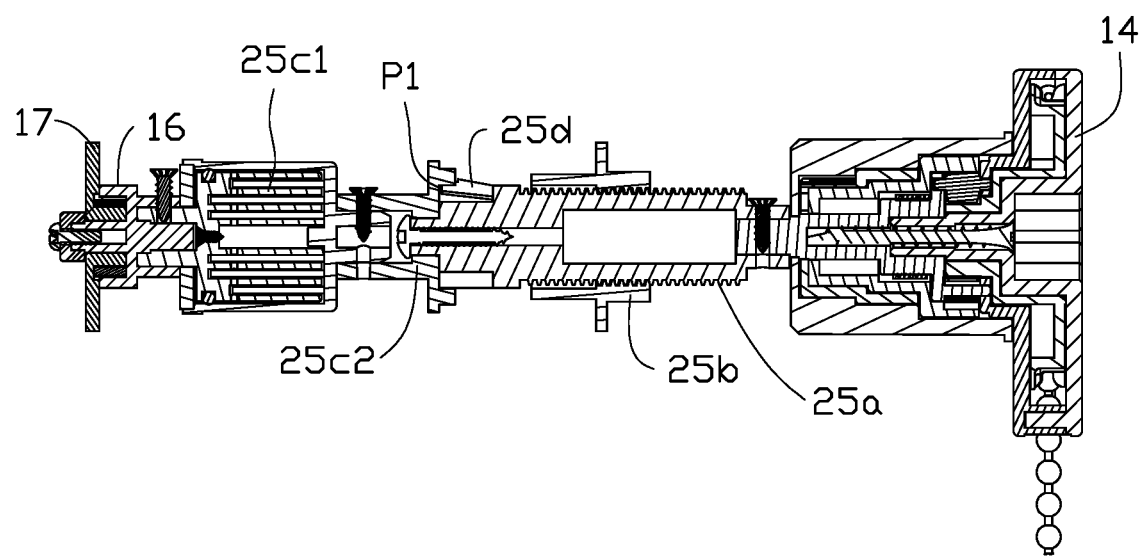
FIG. 11 is a cross-section view of a window covering system according to another embodiment of the present disclosure, illustrating a restraint unit of the window covering system such that the restraint unit is arranged at the first position.
Figure 12:
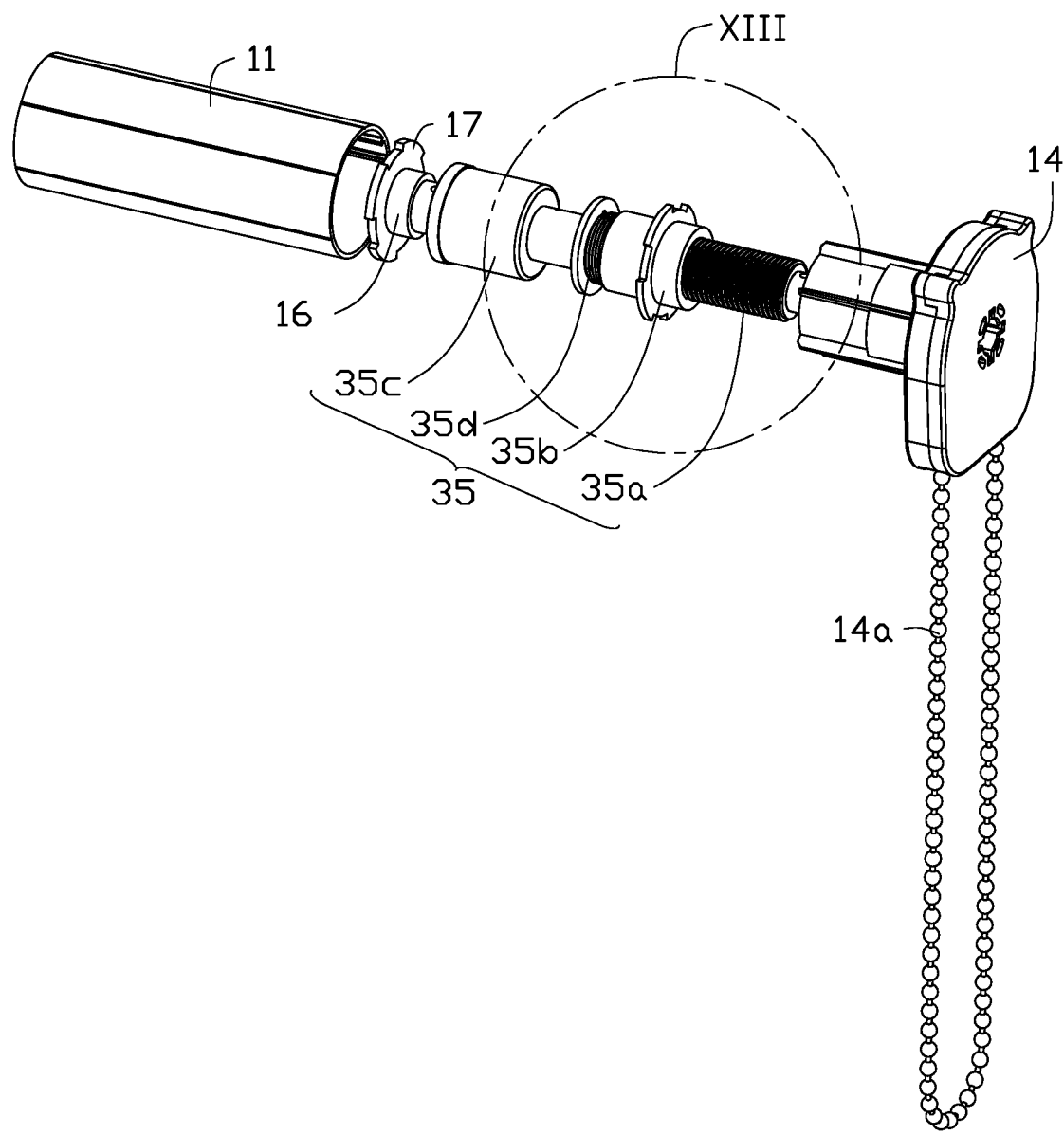
FIG. 12 is a partial perspective view of the window covering system according to one embodiment of the present disclosure.
Figure 13:
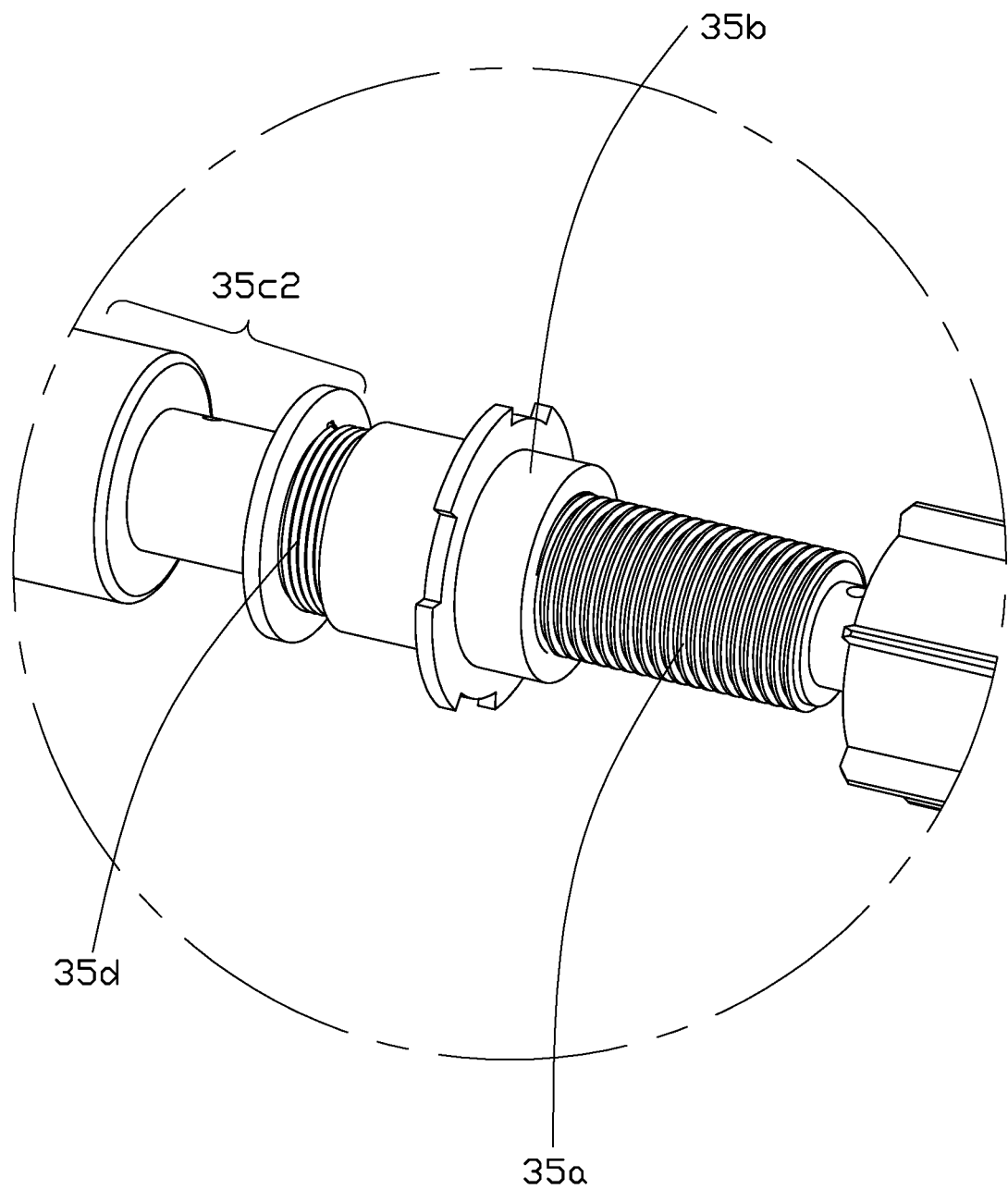
FIG. 13 is a partial perspective view of a window covering system according to another embodiment of the present disclosure, illustrating a restraint unit of the window covering system such that the restraint unit is arranged at the second position.
Figure 14:
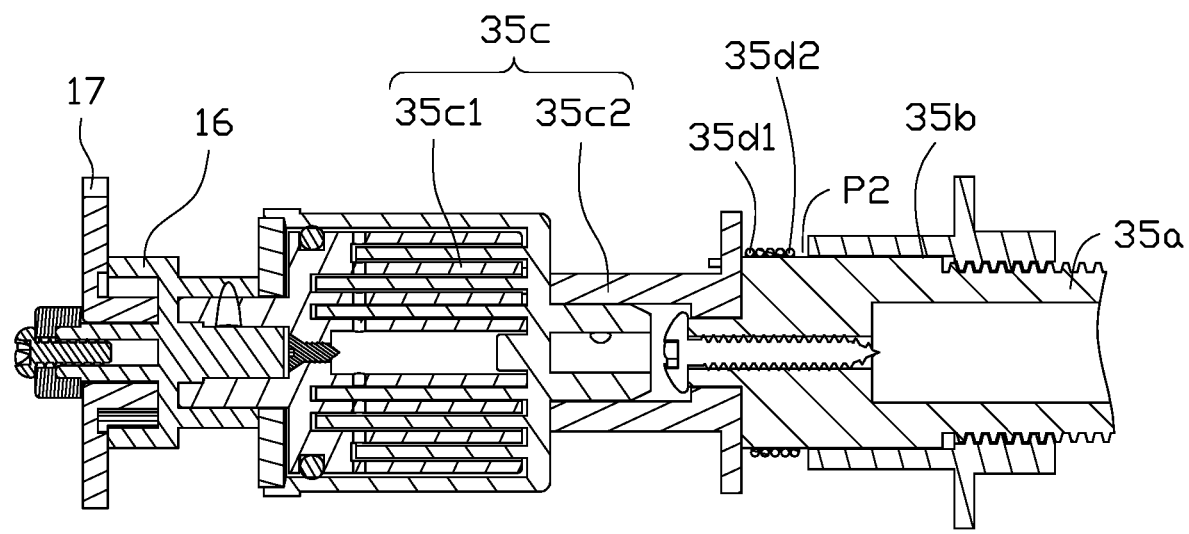
FIG. 14 is a cross-section perspective view of FIG. 13.
Figure 15:
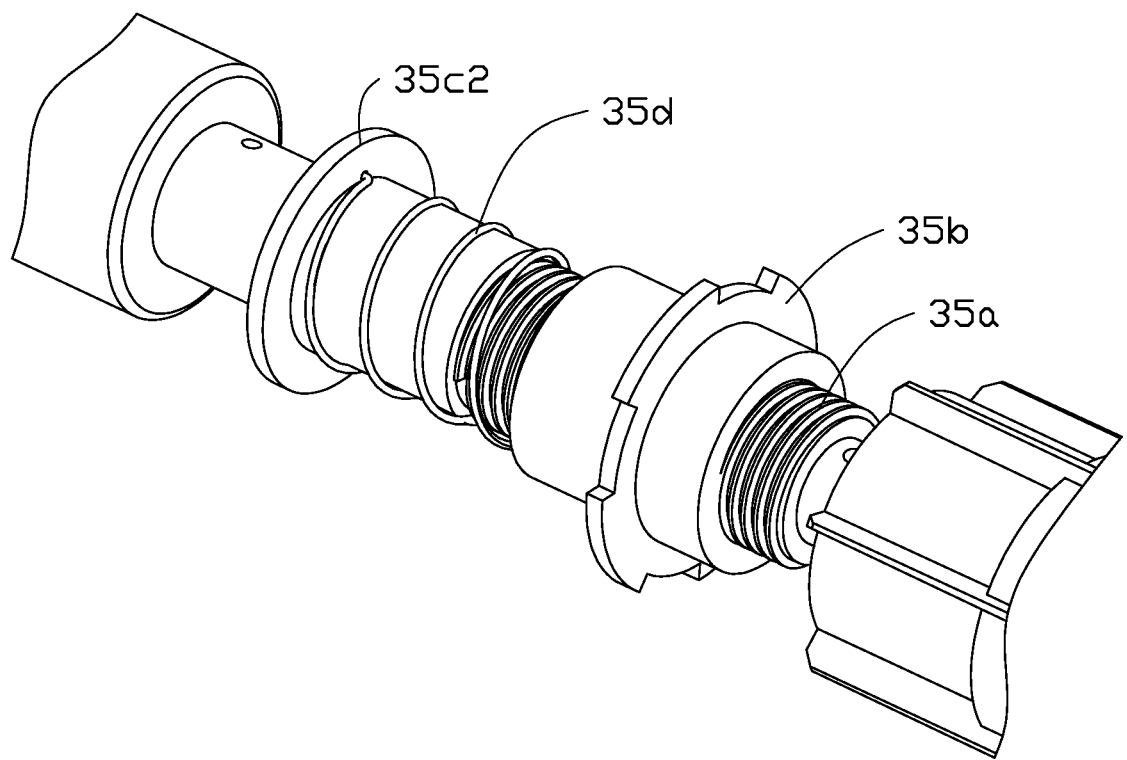
FIG. 15 is a partial perspective of the window covering system according to one embodiment of the present disclosure, illustrating the restraint unit of the window covering system such that the restraint unit is arranged at the first position.
Figure 16:
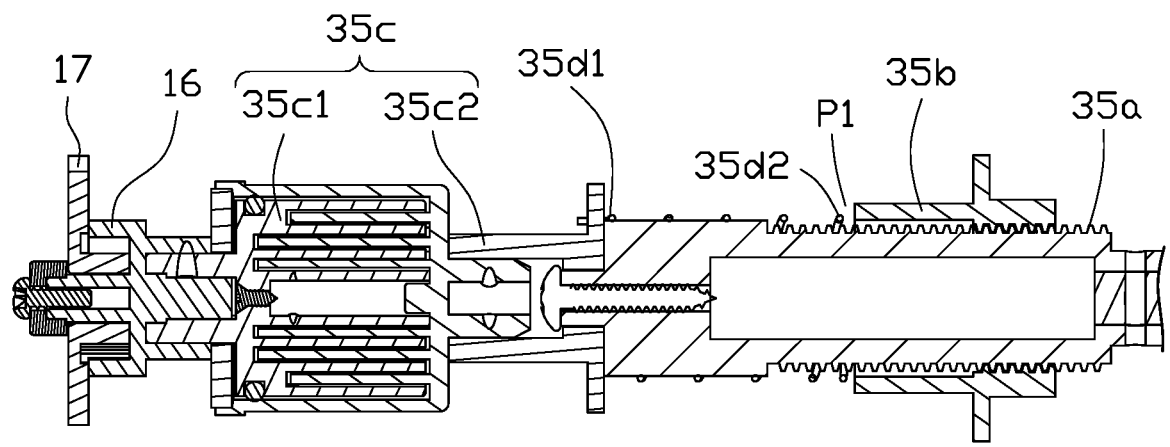
FIG. 16 is a cross-section perspective view of FIG. 15.
Figure 21:
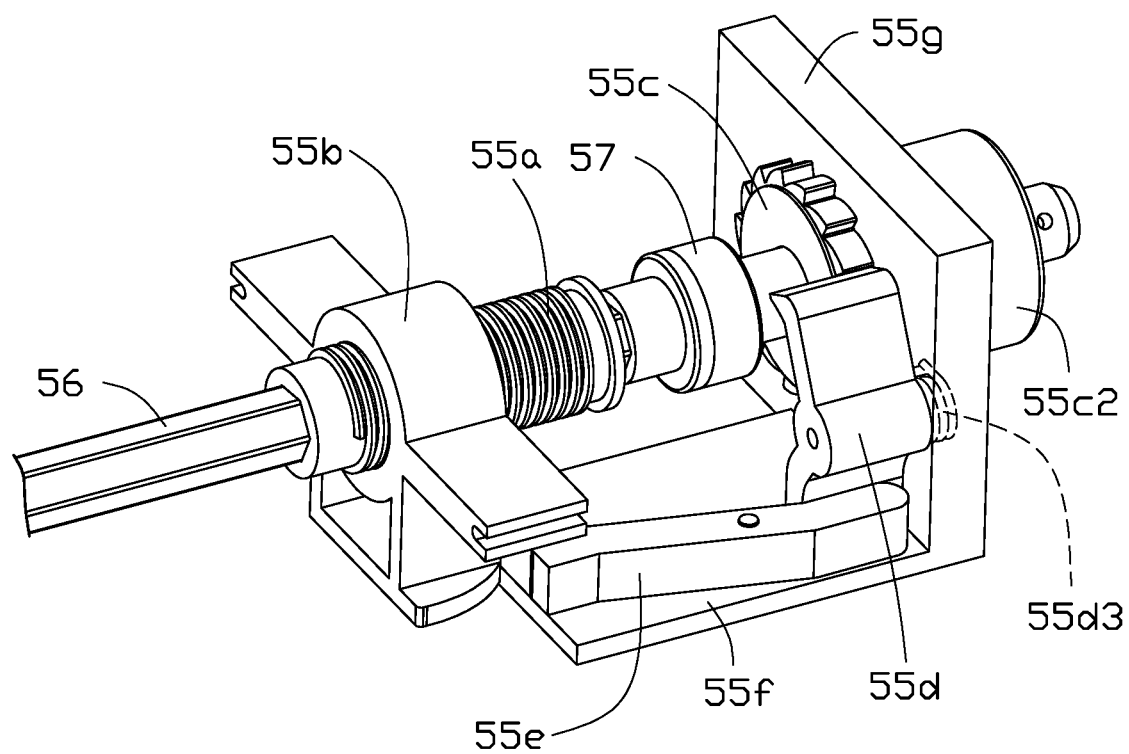
FIG. 21 is a partial perspective view of the window covering system according to one embodiment of the present disclosure.
Figure 22:
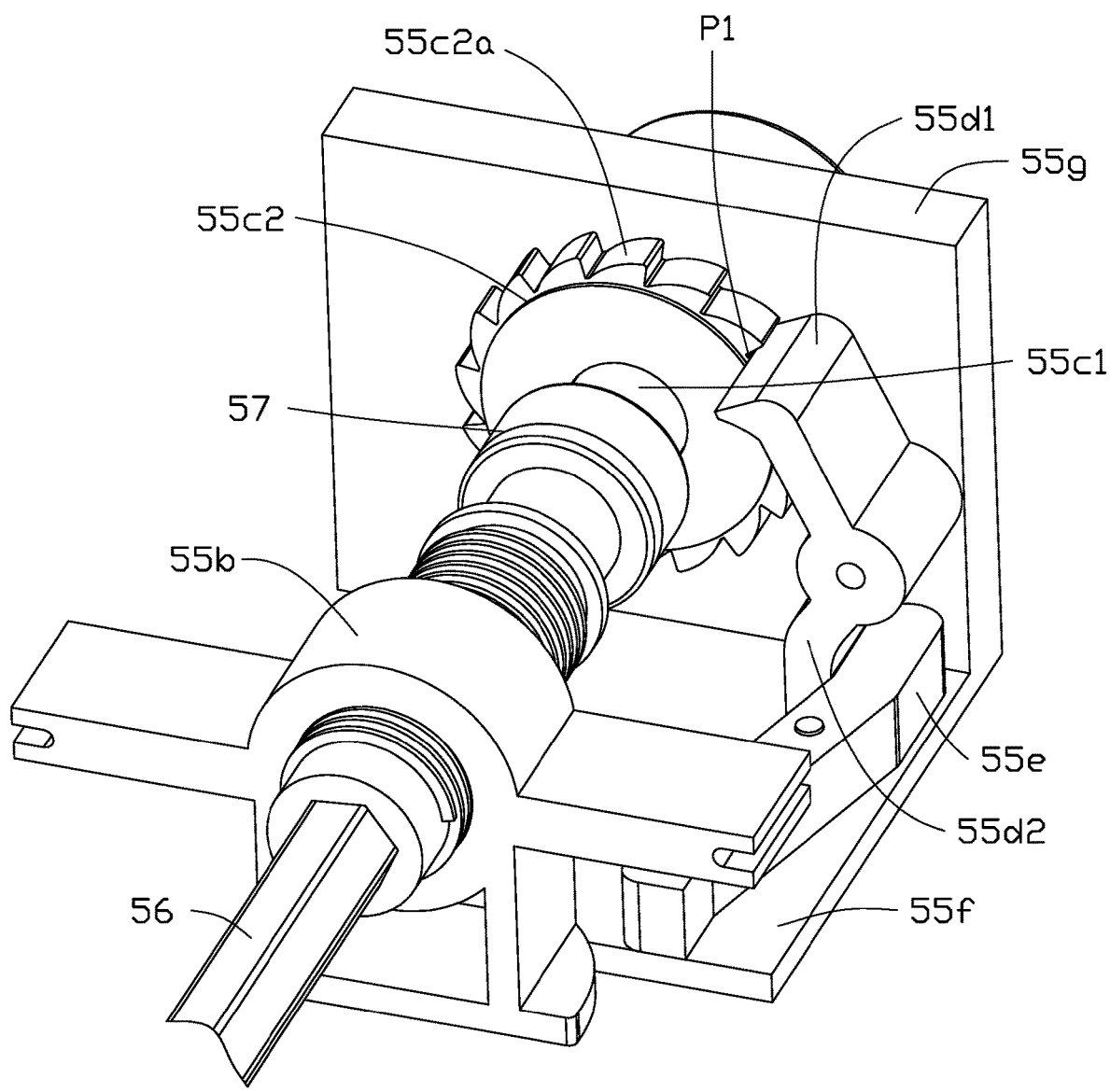
FIG. 22 is a partial perspective view of the window covering system according to one embodiment of the present disclosure, illustrating a restraint unit of the window covering system such that the restraint unit is arranged at the first position.
Figure 23:
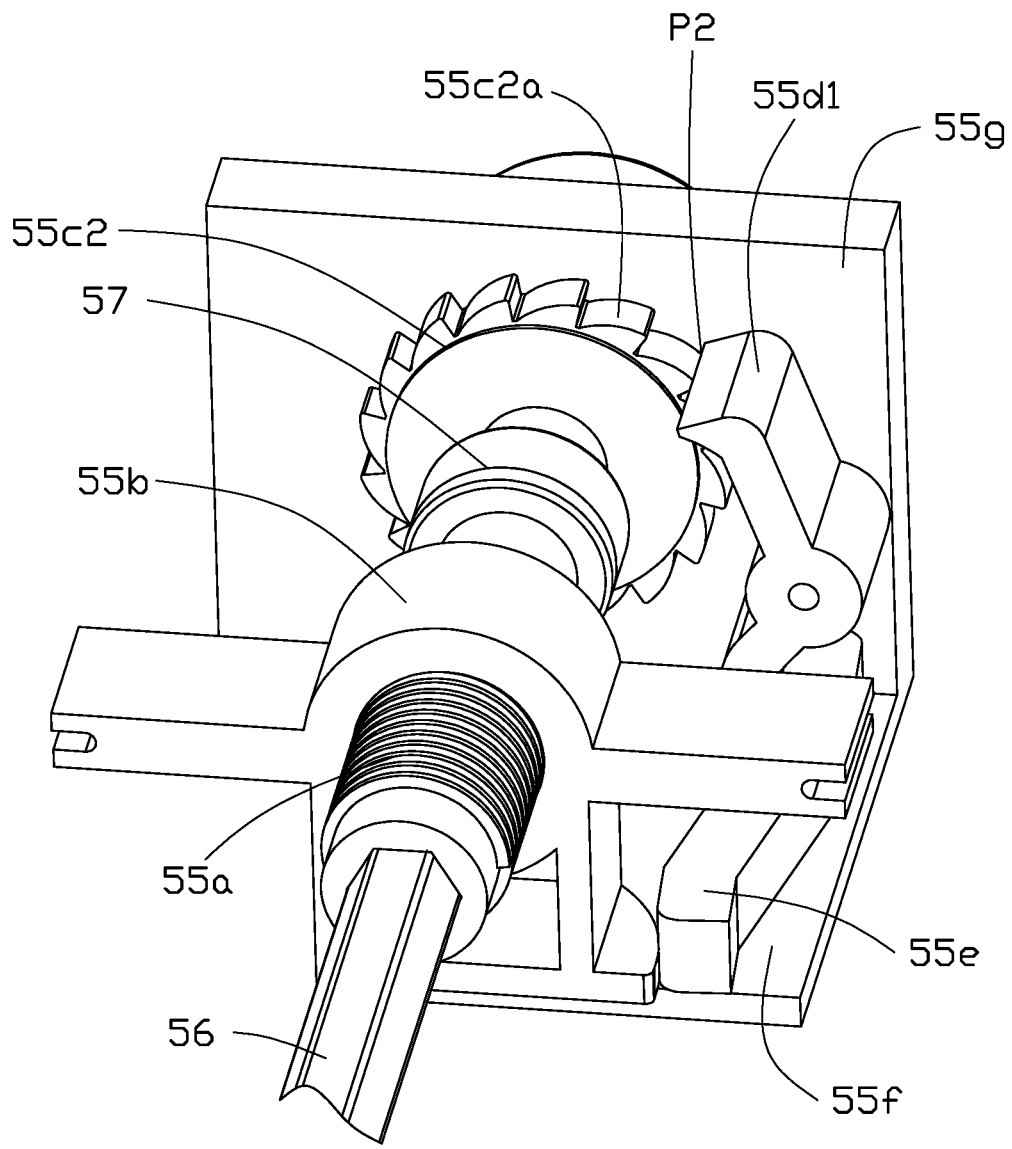
FIG. 23 is a top perspective view of the window covering system according to one embodiment of the present disclosure, illustrating the restraint unit of the window covering system such that the restraint unit is arranged at the second position.
Figure 24:
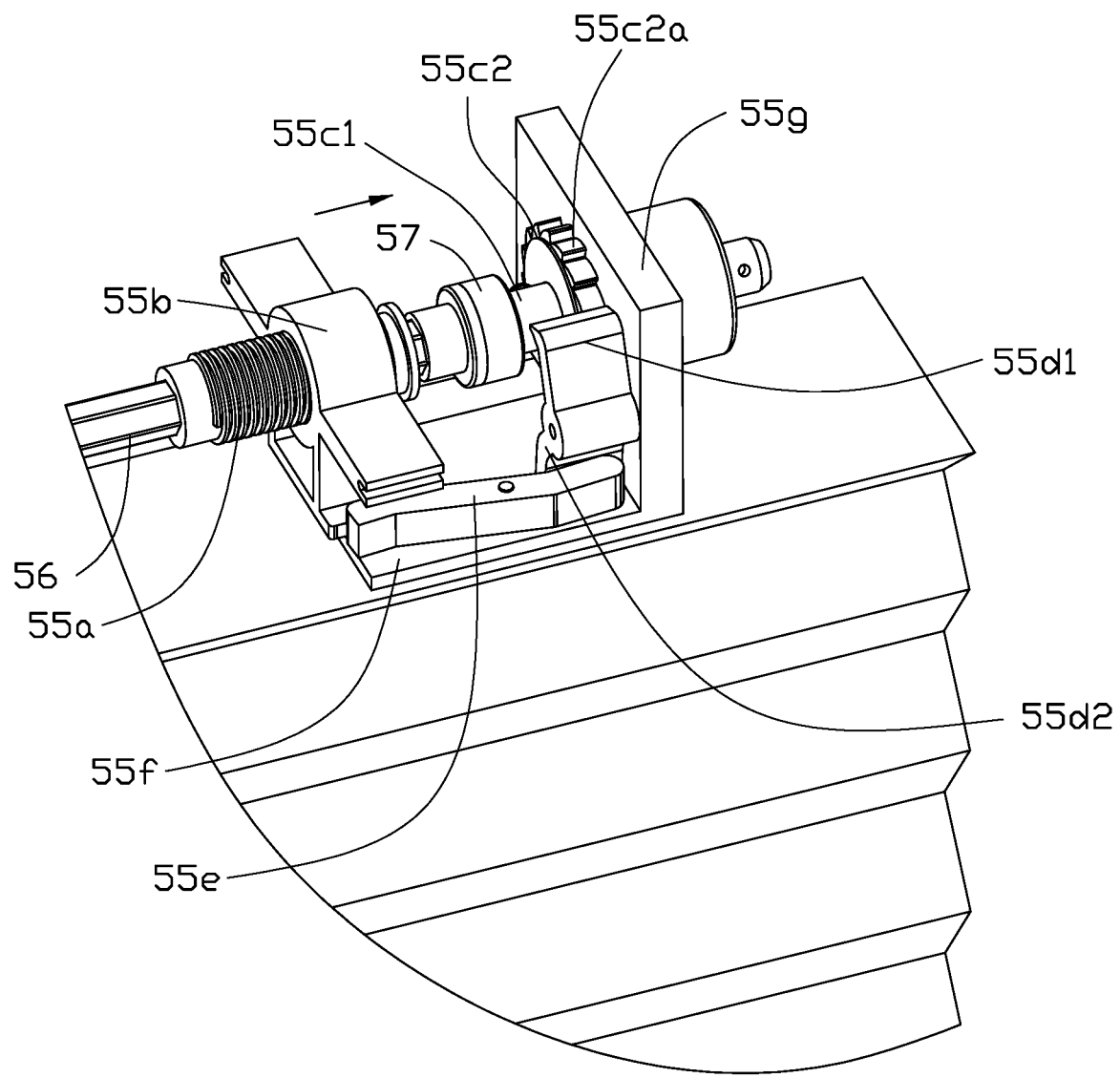
FIG. 24 is a perspective view of the window covering system according to one embodiment of the present disclosure.

The damper 15c further provides a cover 15c2, a rotatable unit 15c1, and a gear 15c2a. The gear 15c2a is set at one end of the cover 15c2 corresponding to the pivot latch 15d such that the gear 15c2a can be engaged by the pivot latch 15d. The latch part 15d1 of the pivot latch 15d is adjacent to the gear 15c2a and the blocking part 15d2 of the pivot latch 15d is located further from the gear 15c2a. The pivot latch 15d can swing pivotally on the shaft 15a. When the latch part 15d1 is at a first position P1, the latch part 15d1 engages to the gear 15c2a. When the latch part 15d1 is at a second position P2, the latch part 15d1 disengages from the gear 15c2a so as to move away the gear 15c2a. Before the pivot latch 15d does not pivotally swing, the latch part 15d1 is arranged at the first position P1 and engages to the gear 15c2a. A pivot of the pivot latch 15d may be eccentric relative to the pivot latch 15d, as shown in FIG. 5. A distance from the latch part 15d1 to the pivot of the pivot latch 15d is less than a distance from the blocking part 15d2 to the pivot of the pivot latch 15d. Therefore, when the pivot latch 15d is not forced, the latch part 15d1 is deflected upwardly relative to the pivot to be positioned at the first position P1 and engage to the gear 15c2a. Alternatively, the pivot latch 15d can further comprise an elastic unit 55d3 (as shown in FIG. 21) arranged in a contained space of the threaded rod 15a so that the elastic unit 55d3 urges the latch part 15d1 to engage to the gear 15c2a at the first position P1. The present disclosure does not limit any set position of the elastic unit, which can also be set between the pivot latch 15d and the threaded rod 15a so as to urge the latch part 15d1 to engage to the gear 15c2a at the first position P1.

The rotatable unit 15c1 is arranged in the cover 15c2 and is extending outward from one end of the cover 15c2, wherein the end of the cover 15c2 is away from the shaft 15a. The one-way clutch 16 is connected to an external end of the rotatable unit 15c1 relative to the cover 15c2 and is able to rotate with the rotatable unit 15c1 simultaneously, or rotates solely relative to the rotatable unit 15c1. The one-way clutch 16 is also connected to a connecting unit 17, an outer surface of the connecting unit 17 engages to an inner surface of the shaft tube 11 so that the connecting unit 17 and the one-way clutch 16 rotate simultaneously when the shaft tube 11 rotates. When the shaft tube 11 collects the covering material 13 by rotation in a first direction, the one-way clutch 16 rotates in the first direction solely relative to the rotatable unit 15c1. When the shaft tube 11 is expanding the covering material 13 by rotation in a second direction opposite of the first direction, the rotatable unit 15c1 rotates in the second direction with the one-way clutch 16 simultaneously. In one embodiment of the present disclosure, the one-way clutch 16 may be a roller clutch. However, the one-way clutch 16 is only a standard configuration in any embodiment of the present disclosure and not a subject of the present disclosure. Therefore, the one-way clutch 16 is not to be described any further.

The operation module 14 may be a cordloop controller comprising a cordloop 14a, and the cordloop may be made of beads as shown in FIG. 1. In one embodiment of the present disclosure, the cordloop may be other operation loop, for example, ropes (not shown).

When the covering material 13 is expanded completely, the nut 15b is moving away from the pivot latch 15d. At the same time, the pivot latch 15d is not urged to pivot, and thus the latch part 15d1 engages to the gear 15c2a of the cover 15c2 at the first position P1 so as to stop the cover 15c2 from rotating.

The cordloop 14a of the operation module 14 is pulled to drive the shaft tube 11 rotating so that the covering material 13 is rolled up. At the same time, the nut 15b and the connecting unit 17 rotates synchronously so that the nut 15b moves toward the pivot latch 15d along the axial direction of the threaded rod 15a when the shaft tube 11 rotates. A rotating direction of the shaft tube 11 is a rotating direction of rolling up the covering material 13, so that the one-way clutch 16 is not engaging the rotatable unit 15c1 by rotation. When the one-way clutch 16 rotates with the connecting unit 17, the one-way clutch 16 rotates solely relative to the rotatable unit 15c1 so that the damper 15c is not driven to output the resistance.

The nut 15b moves toward the pivot latch 15d along the axial direction of the threaded rod 15a and urges the blocking part 15d2 of the pivot latch 15d so that the pivot latch 15d is urged to swing pivotally, and the latch part 15d1 engaging the gear 15c2a at the first position P1 is swung toward the second position P2 away from the gear 15c2a.

The nut 15b keeps moving toward the pivot latch 15d and the latch part 15d1 keeps moving away the gear 15c2a toward the second position P2. When the latch part 15d1 reaches the second position P2, the latch part 15d1 is completely disengaged from the gear 15c2a of the cover 15c2 so that the cover 15c2 can be driven to rotate solely.

When the covering material 13 is completely rolled up onto the shaft tube 11, the latch part 15d1 of the pivot latch 15d is arranged at the second position P2 where the latch part 15d1 is completely disengaged from the gear 15c2a of the cover 15c2, so that the cover 15c2 can be driven to rotate solely.

When the covering material 13 starts expanding due to the weight of the bottom rail 12 and the covering material 13, the shaft tube 11 rotates reversely and drives the nut 15b and the connecting unit 17 rotating reversely. The reverse rotation defines the covering material 13 expanding downward. The one-way clutch 16 is engaged to the rotatable unit 15c1 of the damper 15c by rotation and is driven to rotate by the connecting unit 17 so as to drive the rotatable unit 15c1 rotating synchronously. At the same time, the latch part 15d1 at the second position P2 disengages from the gear 15c2a of the cover 15c2 so that the cover 15c2 can be rotated with the rotatable unit 15c1 simultaneously. Even though the damper 15c is driven together with the rotation of the rotatable unit 15c1, the damper 15c is not outputting the resistance.

During the extension of the covering material 13, the nut 15b is driven by the shaft tube 11 rotating reversely so as to move along the axial direction of the shaft 15a away from the pivot latch 15d. The pivot latch 15d swings pivotally by gravity acting upon the blocking part 15d2 due to the eccentric pivot of the pivot latch 15d or a recovery force from the elastic unit 55d3 (as shown in FIG. 21) so that the latch part 15d1 moves from the second position P2 toward the first position P1 and then engages to the gear 15c2a to stop the cover 15c2 from rotating when the latch part 15d1 is moved to the first position P1. The rotatable unit 15c1 of the damper 15c is still driven to rotate by the one-way clutch 16 while the cover 15c2 is not rotating so that the damper 15c outputs the resistance to decrease a rotating speed of the rotatable unit 15c1. Before the covering material 13 is completely expanded, the rotating speed of the one-way clutch 16, the connecting unit 17 and the shaft tube 11 is affected and slowed by the rotatable unit 15c1 due to simultaneous rotation of the one-way clutch 16, the connecting unit 17, the shaft tube 11 and the rotatable unit 15c1. Accordingly, the damper 15c outputs the resistance to produce a damping effect.

When the covering material 13 of the window covering system 10 is completely rolled up, the covering material 13 only experience a downward force from weight of the bottom rail 12. When the covering material 13 starts expanding, the damper 15c does not output the resistance to the shaft tube 11 to avoid decreasing the rotating speed of the shaft tube 11 before the covering material 13 is expanded to a specific length. When the covering material 13 is expanded to the specific length, the weight of the expanded covering material 13 and the bottom rail 12 increases the downward force so that the shaft tube 11 is driven to rotate rapidly during rapidly expanding the covering material 13. At the same time, the damper 15c outputs the resistance to decrease the rotating speed of the shaft tube 11, and thus preventing the covering material 13 from expanding rapidly, and further preventing the bottom rail 12 or the covering material 13 from colliding and damaging the surroundings.

Referring to FIGS. 6-11, a window covering system 20 is shown according to one embodiment of the present disclosure, wherein the window covering system 20 is exemplified by a roller shade just like the window covering system 10 in FIG. 1. The window covering system comprises a displacement controlling device 25. In one embodiment of the present disclosure, the displacement controlling device 25 comprises a shaft which is a threaded rod 25a fixed in the shaft tube 11 and having a long rod body, a movable unit which is a nut 25b sleeved over the threaded rod 25a by a threaded engagement, a damper 25c connected to an end of the threaded rod 25a, and a restraint unit which is a latch 25d operably arranged at the end of the threaded rod 25a near the damper 25c, wherein the nut 25b can be driven to move within a displacement region on the threaded rod 25a. The nut 25b is driven to rotate by rotation of the shaft tube 11 to move along an axial direction of the threaded rod 25a. The latch 25d protrudes radially outward relative to an axis of the threaded ford 25a from an outer surface of the threaded rod 25a while the latch 25d is not operated such that the latch 25d is at a first position P1, wherein the latch 25d can be operated radially toward the axis of the threaded rod 25a such that the latch 25d is at a second position P2.

The damper 25c comprises a cover 25c2 and a rotatable unit 25c1. A gear 25c2a is defined at one side of the cover 25c2 corresponding to the latch 25d such that the gear 25c2a can be engaged by the latch 25d is at the first position P1. On the contrary, when the latch 25d is operated radially toward the axis of the threaded rod 25a, the latch 25d at the first position P1 engages to the gear 25c2a so as to be pressed. When the latch 25d disengages from the gear 25c2a.

The rotatable unit 25c1 is arranged in the cover 25c2 and is extending outward from one end of the cover 25c2, wherein the one end is opposite to the threaded rod 25a. A one-way clutch 16 is connected to an end of the rotatable unit 25c1 opposite to the cover 25c2, wherein the one-way clutch 16 can rotate with the rotatable unit 25c1 simultaneously or rotate freely relative to the rotatable unit 25c1. A connecting unit 17 is connected between the one-way clutch 16 and the shaft tube 11, whereby the one-way clutch 16 is driven by the shaft tube 11 to rotate simultaneously with the shaft tube 11. When the shaft tube 11 is collecting the covering material 13 by rotation, the one-way clutch 16 rotates freely relative to the rotatable unit 25c1. When the shaft tube 11 is expanding the covering material 13 by rotation, the one-way clutch 16 rotates with the rotatable unit 25c1 simultaneously. In one embodiment of the present disclosure, the one-way clutch 16 may be a roller clutch. However, the one-way clutch 16 is only a standard configuration in any embodiment of the present disclosure and not a subject of the present disclosure. Therefore, the one-way clutch 16 is not to be described any further.

In one embodiment of the present disclosure, a similar operational process to the previous embodiment, when the covering material 13 is expanded completely, the nut 25b is away from the latch 25d, wherein the latch 25d is at the first position P1 due to self-elasticity and engaged to the gear 25c2a of the cover 25c2 as the nut 25b is not pressing the latch 25d.

When the shaft tube 11 rotates to collect the covering material 13, the nut 25b is driven to rotate simultaneously, wherein the nut 25b moves toward the latch 25d along the axial direction of the threaded rod 25a. While the nut 25b moves over the latch 25d at the end of the threaded rod 25a, the latch 25d is pressed to pivot from the first position P1 toward the second position P2, wherein the latch 25d disengages from the gear 25c2a at the second position P2. As the shaft tube 11 rotates to collect the covering material 13, the one-way clutch 16 rotates freely relative to the rotatable unit 25c1 so that the damper 25c is not driven to output the resistance.

When the covering material 13 starts expanding, the latch 25d is at the second position P2 such that disengaged from the gear 25c2a, and thus the cover 25c2 can rotate freely. At the same time, the rotatable unit 25c1 of the damper 25c is driven by the one-way clutch 16 to rotate with the cover 25c2 simultaneously, whereby the damper 25c is driven but does not output the resistance.

While the covering material 13 is expanding, the nut 25b moves along the axial direction of the threaded rod 25a away from the latch 25d, wherein the latch 25d pivots from the second position P2 toward the first position P1 due to self-elasticity, and thus engaging to the gear 25c2a of the cover 25c2 to restrict the cover 25c2 from rotating. At the same time, the rotatable unit 25c1 is driven by the one-way clutch 16 to rotate. However, the cover 25c2 is restrict from rotating so that the damper 25c outputs the resistance, and a rotating speed of the rotatable unit 25c1 decreases corresponding to the resistance of the damper 25c. Therefore, a rotating speed of the one-way clutch 16 and the shaft tube 11, which are rotating simultaneously with the rotatable unit 25c1, is decreased until the covering material 13 is completely expanded. At this moment, the damper 25c outputs the resistance to provide a damping effect.

Referring to FIGS. 12-16, a window covering system is shown according to one embodiment of the present disclosure, wherein the window covering system 30 is exemplified by a roller shade just like the window covering system 10 in FIG. 1. The window covering system 30 comprises a shaft which is a threaded rod 35a fixed in the shaft tube 11 and having a long rod body, a movable unit which is a nut 35b sleeved over the threaded rod 35a by a threaded engagement, a damper 35c connected to an end of the threaded rod 35a, and a restraint unit which is a coil spring 35d, wherein the nut 35b can be driven to move within a displacement region on the threaded rod 35a. The nut 35b is driven to rotate by rotation of the shaft tube 11 to move along an axial direction of the threaded rod 35a.

The damper 35c comprises a cover 35c2 and a rotatable unit 35c1. The coil spring 35d surrounds at the surface of the threaded rod 35a, wherein the coil spring 35d has a fixed end 35d1 fixed to the cover 35c2, and a free end 35d2 extending along an axial direction of the threaded rod 35a, that is defined as a first position P1. When the free end 35d2 is at the first position P1, the coil spring 35d coils tightly over the threaded rod 35a to provide a restriction force, and the cover 35c2 is restricted from rotating freely as the fixed end 35d1 of the coil spring 35d is fixed to the cover 35c2. When the free end 35d2 is forced to move toward the fixed end 35d1, the coil spring 35d is compressed. When the free end 35d2 is driven to move toward the fixed end 35d1, a diameter of the coil spring 35d is increased to be larger than a diameter of the threaded rod 35a such that the free end 35d2 is defined as at a second position P2, whereby the coil spring 35d and the cover 35c2 can rotate freely relative to the threaded rod 35a.

The rotatable unit 35c1 is arranged in the cover 35c2 and is extending outward from one end of the cover 35c2, wherein the one end is opposite to the threaded rod 35a. A one-way clutch 16 is connected to an exposed end of the rotatable unit 35c1, wherein the one-way clutch 16 can rotate with the rotatable unit 35c1 simultaneously or rotate freely relative to the rotatable unit 35c1. A connecting unit 17 is connected between the one-way clutch 16 and the shaft tube 11, whereby the one-way clutch 16 is driven by the shaft tube 11 to rotate simultaneously with the shaft tube 11. When the shaft tube 11 is collecting the covering material 13 by rotation, the one-way clutch 16 rotates freely relative to the rotatable unit 35c1. When the shaft tube 11 is expanding the covering material 13 by rotation, the one-way clutch 16 rotates with the rotatable unit 35c1 simultaneously. In one embodiment of the present disclosure, the one-way clutch 16 may be a roller clutch. However, the one-way clutch 16 is only a standard configuration in any embodiment of the present disclosure and not a subject of the present disclosure. Therefore, the one-way clutch 16 is not to be described any further.

As described above, when the free end 35d2 of the coil spring 35d is not forced to move, the free end 35d2 is at the first position P1 such that the coil spring 35d coils tightly over the threaded rod 35a to provide a restriction force when the covering material 13 is completely expanded, whereby the cover 35c2 is fixed.

When the shaft tube 11 rotates to collect the covering material 13, the nut 35b is driven to rotate simultaneously, wherein the nut 35b moves toward the free end 35d2 of the coil spring 35d along the axial direction of the threaded rod 35a. As the nut 35b moves along the threaded rod 35a toward the coil spring 35d at the end of the threaded rod 35a and engages the free end 35d2 of the coil spring 35d, the coil spring 35d starts to compress, whereby the diameter of the coil spring 35d changes. While the nut 35b continue compressing the coil spring 35d to urge the free end 35d2 toward the fixed end 35d1, the free end 35d2 moves from the first position P1 toward the second position P2, wherein the diameter of the coil spring 35d increases. When the free end 35d2 is at the second position such that the diameter of the coil spring 35d is larger than the diameter of the threaded rod 35a, the coil spring 35d can rotate freely relative to the threaded rod 35a, whereby the cover 35c2 can rotate freely. As the shaft tube 11 rotates to collect the covering material 13, the one-way clutch 16 rotates freely relative to the rotatable unit 35c1 so that the damper 35c is not driven to output the resistance.

When the covering material 13 starts expanding, the free end 35d2 of the coil spring 35d is at the second position P2, and thus the cover 35c2 can rotate freely. At the same time, the rotatable unit 35c1 of the damper 35c can be driven by the one-way clutch 16 to rotate with the cover 35c2 simultaneously, whereby the damper 35c is driven but does not output the resistance.

While the covering material 13 is expanding, the nut 35b moves along the axial direction of the threaded rod 35a away from the coil spring 35d, wherein the free end 35d2 of the coil spring 35d moves from the second position P2 toward the first position P1 due to self-elasticity, and thus restricts the cover 35c2 from rotating at the first position P1. At the same time, the rotatable unit 35c1 is driven by the one-way clutch 16 to rotate. However, the cover 35c2 is restrict from rotating so that the damper 35c outputs the resistance, and a rotating speed of the rotatable unit 35c1 decreases correspondingly to the resistance of the damper 35c. Therefore, a rotating speed of the one-way clutch 16 and the shaft tube 11, which are rotating simultaneously with the rotatable unit 35ca, is decreased until the covering material 13 is completely expanded. The damper 35c outputs the resistance to provide a damping effect.

Figure 17:
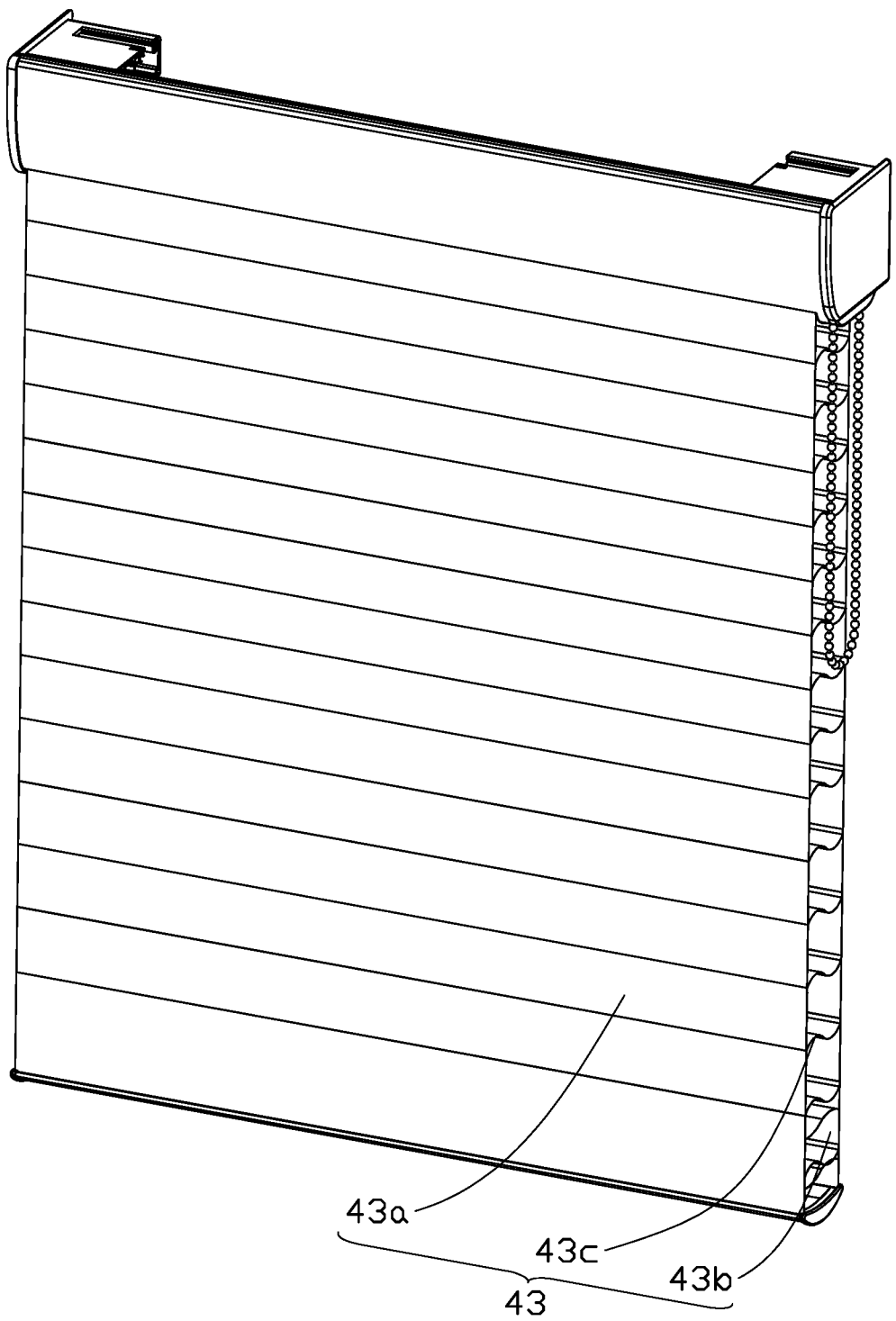
FIG. 17 is a perspective view of a window covering system according to another embodiment of the present disclosure.

In a one embodiment of the present disclosure, a window covering system with a covering material 43 which is a sheer shade as shown in FIG. 17.

In one embodiment of the present disclosure, the displacement controlling device 15, the displacement controlling device 25, and the displacement controlling device 35 are all applicable to the window covering system with the covering material 43.

Figure 18:
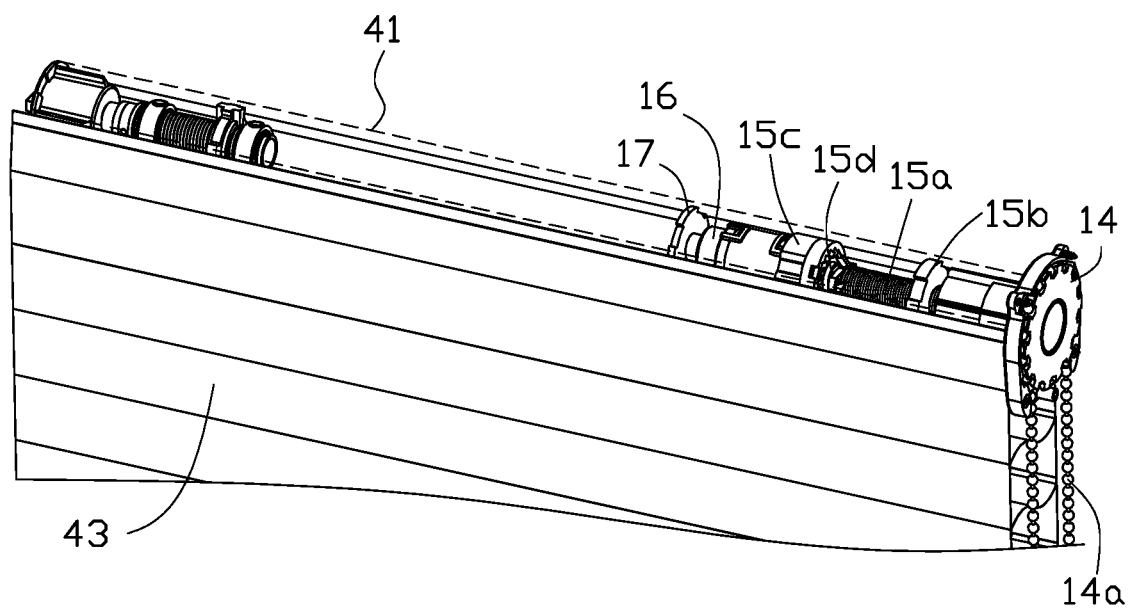
FIG. 18 is a partial perspective view of the window covering system according to one embodiment of the present disclosure.
Figure 19:
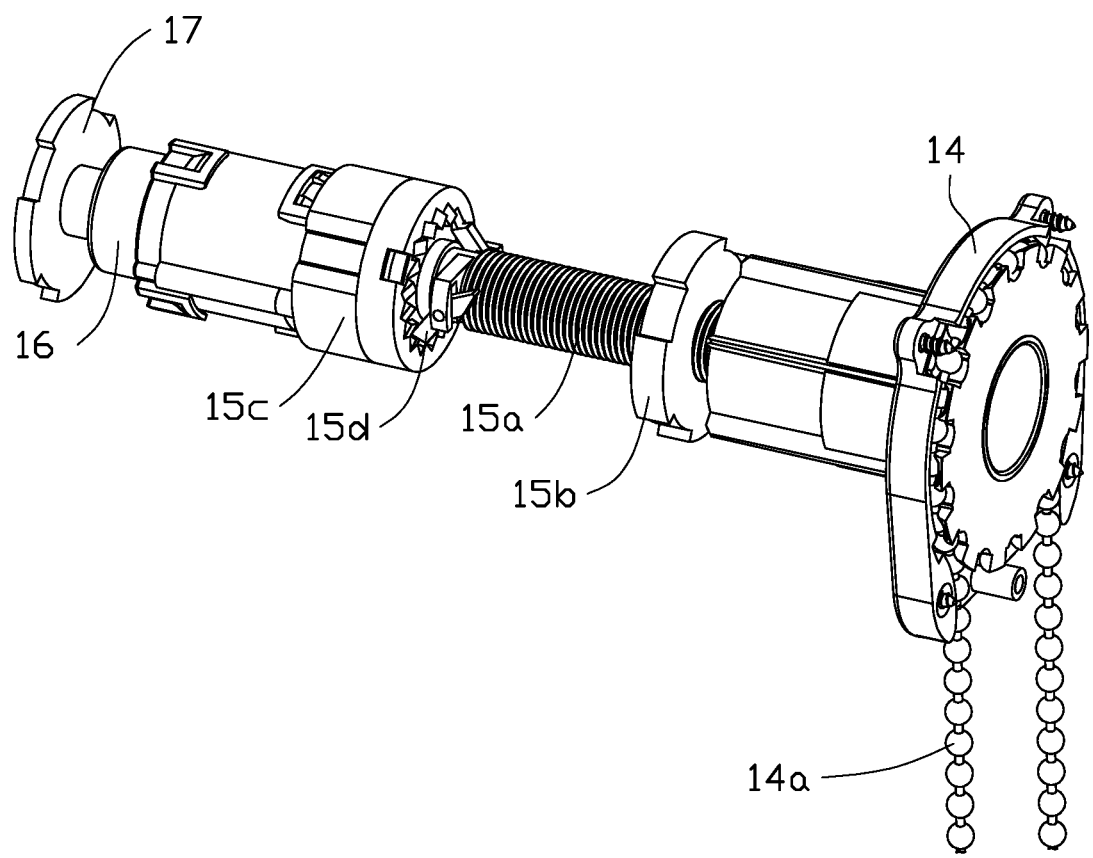
FIG. 19 is a perspective view of the window covering system according to one embodiment of the present disclosure.

Referring to FIGS. 17-19, the window covering system comprising the displacement controlling device 15, wherein the covering material 43 of the window covering system comprises a front cover 43a, a back cover 43b corresponding to the front cover 43a such that parallel arranged opposite to the front cover 43a, and a plurality of connecting sheets 43c connected between the front cover 43a and the back cover 43b. When the shaft tube 41 starts rotating, at least one of the front cover 43a and the back cover 43b is dislocated relative to another by the shaft tube 41 such that the plurality of the connecting sheets 43c are vertically oriented, whereby the front cover 43a is closely arranged with the back cover 43b, and hence the covering material 43 is collected by the shaft tube 41. It should be noted that, the operations of the displacement controlling device 15 relative to the collection or expansion of the covering material 43 is the same as aforementioned embodiments. However, in the case of the covering material 43 is a sheer shade, the shaft tube 41 continue rotating after expanding the covering material 43 completely such that at least one of the front cover 43a and the back cover 43b is dislocated relative to another, whereby the connecting sheets 43c are oriented horizontally as before, and thus the front cover 43a and the back cover 43b are separated.

Figure 20:
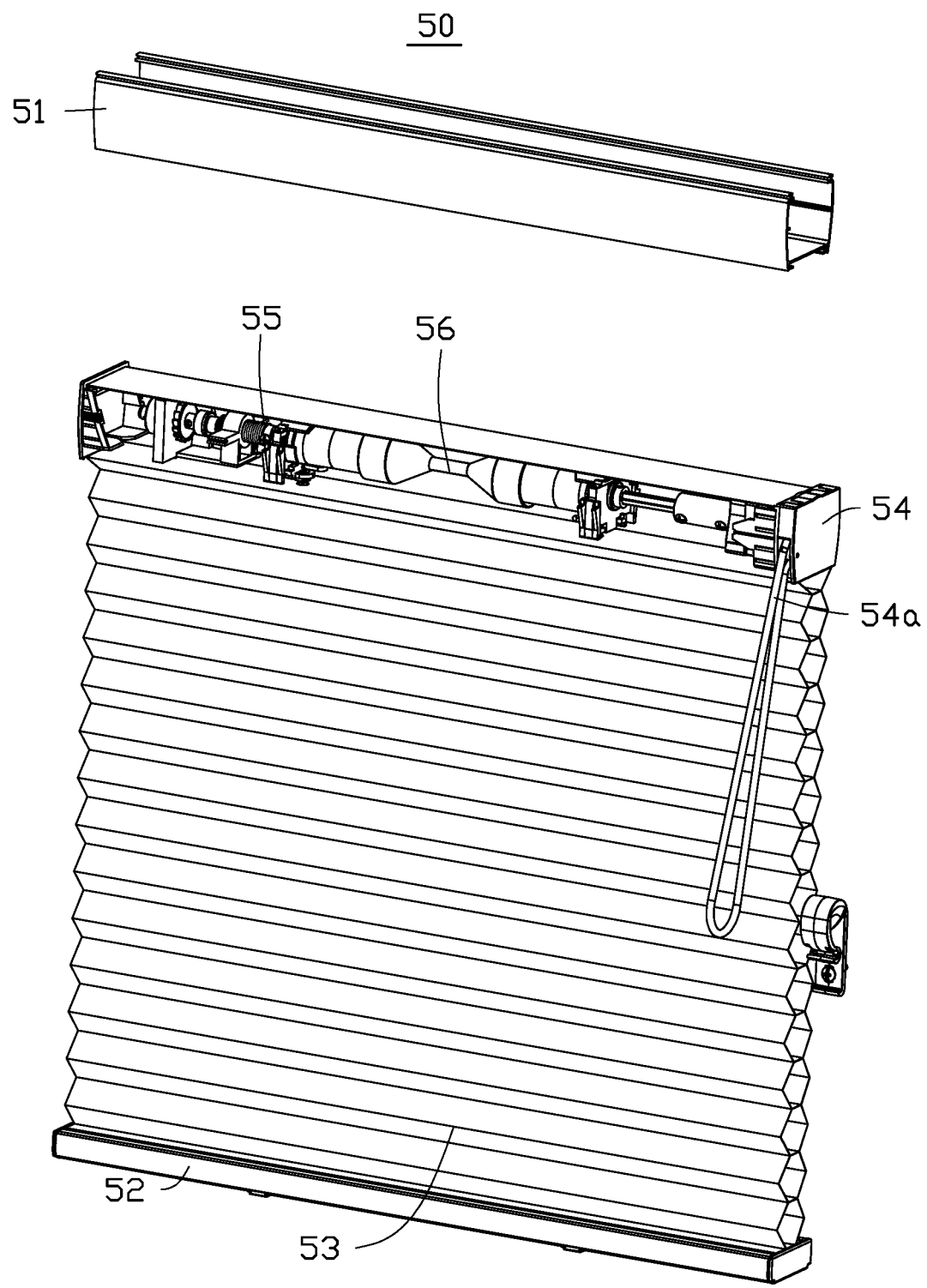
FIG. 20 is a perspective view of a window covering system according to another embodiment of the present disclosure.

In a one embodiment of the present disclosure, a displacement controlling device 55 is applied in a cellular shade as shown in FIG. 20.

Referring to FIGS. 20-24, a window covering system 50, which is exemplified by a cellular shade, comprises a cuboid headrail 51 with a long axis and a short axis, a bottom rail 52 below the headrail 51, a covering material 53 between the headrail 51 and the bottom rail 52. The window covering system 50 further comprises an operation module 54, a displacement controlling device 55, and a driving module 56 all arranged in the headrail 51, wherein the driving module 56 comprises a driving rod, a cord collecting wheel, at least one cord, etc. The operation module 54 is arranged at one end of the headrail 51 and connected to the driving module 56 for driving the driving module 56 to expand or collect the covering material 53, wherein the driving module 56 is connected to the displacement controlling device 55 to operate simultaneously with the displacement controlling device 55.

The displacement controlling device 55 comprises a shaft connected to the driving module 56 to operate simultaneously with the driving module 56, a movable unit connected to the shaft, a damper 55c connected to one end of the shaft, a restraint unit arranged between the movable unit and the damper 55c, wherein the movable unit can be driven to move within a displacement region on the shaft.

In one embodiment of the present disclosure, the shaft is a threaded rod 55a having a long rod body, wherein one end of the threaded rod 55a is connected to the driving module 56 to rotate with the driving module 56 simultaneously, and the other end of the threaded rod 55a is connected to the damper 55c. The movable unit is a nut 55b sleeved over the threaded rod 55a by a threaded engagement such that the nut 55b moves along an axial direction of the threaded rod 55a while the threaded rod 55a rotates. The restraint unit is a pivot latch 55d which is pivotally connected to the headrail 51 such that the pivot latch 55d can pivot about a pivot axis of the pivot latch 55d parallel to the long axis of the headrail 51, wherein one end of the pivot latch 55d is a latch part 55d1, and the other end of the pivot latch 55d is a blocking part 55*d*2, and wherein the pivot axis is between the latch part 55*d*1 and the blocking part 55*d*2.

Moreover, a linking unit 55*e* is pivotally connected in the headrail 51, wherein the linking unit 55*e* can pivot about a pivot axis of the linking unit 55*e* which is parallel to the short axis of the headrail 51, and wherein the linking unit 55*e* is arranged between the nut 55*b* and the pivot latch 55*d*. Two ends of the linking unit 55*e* are arranged corresponding to the nut 55*b* and the blocking part 55*d*2 of the pivot latch 55*d* such that one end of the linking unit 55*e* abuts the blocking part 55*d*2 to pivot the pivot latch 55*d* when the nut 55*b* urges the other end of the linking unit 55*e* to pivot.

In addition, a base 55*f* is provided under the threaded rod 55*a* along the bottom of the headrail 51, and a wall 55*g* is vertically arranged on the base 55*f*. The base 55*f* is configured to be pivotally connected by the linking unit 55*e* on top of the base 55*f*, and the wall 55*g* is configured to fix the damper 55*c* as well as be pivotally connected by the pivot latch 55*d*. Thus, the base 55*f*, the wall 55*g*, the linking unit 55*e*, the pivot latch 55*d*, and the damper 55*c* are assembled by modularization in the headrail 51.

The damper 55*c* comprises a cover 55*c*2 and a rotatable unit 55*c*1 arranged in the cover 55*c*2, wherein the cover 55*c*2 comprises a gear 55*c*2*a* at an end. The end of the cover 55*c*2 is arranged corresponding to the pivot latch 55*d* such that the pivot latch 55*d* can engage to the gear 55*c*2*a*. The latch part 55*d*1 of the pivot latch 55*d* is adjacent to the gear 55*c*2*a*, and the blocking part 55*d*2 is away from the gear 55*c*2*a*. The pivot latch 55*d* is configured to pivot in the headrail 51 such that the latch part 55*d*1 engages to the gear 55*c*2*a* at a first position P1, and the latch part 55*d*1 disengages from the gear 55*c*2*a* at a second position P2. Furthermore, to maintain the latch part 55*d*1 engaging to the gear 55*c*2*a* at the first position P1 before the pivot latch 55*d* is pivoted, a pivot of the pivot latch 55*d* may be eccentric relative to the pivot latch 55*d*. Alternatively, the pivot latch 55*d* can further comprises an elastic unit 55*d*3 (as shown in FIG. 21) in a containing space defined in the headrail 51 or the wall 55*g*, but not limited thereto. Otherwise, the elastic unit 55*d*3 can be arranged between the pivot latch 55*d* and the headrail 51 or between the pivot latch 55*d* and the wall 55*g*. A recovery force is provided by the elastic unit 55*d*3 to urge the latch part 55*d*1 engaging to the gear 55*c*2*a* at the first position P1 before the pivot latch 55*d* is pivoted.

The rotatable unit 55*c*1 is arranged in the cover 55*c*2, and a one-way clutch 57 is sleeved between the rotatable unit 55*c*1 and the threaded rod 55*a*. When the one-way clutch 57 is driven by rotation of the threaded rod 55*a*, the one-way clutch 57 can rotate with the rotatable unit 55*c*1 simultaneously or rotate freely relative to the rotatable unit 55*c*1. When the driving module 56 drives the threaded rod 55*a* to rotate for collecting the covering material 53, the one-way clutch 57 rotates freely relative to the rotatable unit 55*c*1. When the driving module 56 drives the threaded rod 55*a* to rotate for expanding the covering material 53, the one-way clutch 57 rotates simultaneously with the rotatable unit 55*c*1. In one embodiment of the present disclosure, the one-way clutch 57 may be a roller clutch. However, the one-way clutch 57 is only a standard configuration in any embodiment of the present disclosure and not a subject of the present disclosure. Therefore, the one-way clutch 57 is not to be described any further.

In one embodiment of the present disclosure, the operation module 54 may be a cordloop controller. A cordloop 54*a* of the cordloop controller can be made of a rope as shown in FIG. 20, or other types of cordloop, for example, a cordloop made of beads (not shown).

When the covering material 53 is completely collected, the nut 55*b* on the threaded rod 55*a* is away from the pivot latch 55*d* such that the linking unit 55*e* and the pivot latch 55*d* are not urged to pivot. The latch part 55*d*1 of the pivot latch 55*d* is configured to engage gear 55*c*2*a* of the cover 55*c*2 at the first position P1 due to the eccentric pivot or the recovery force of the elastic unit 55*d*3 such that the cover 55*c*2 is restricted from rotating by the pivot latch 55*d*.

When the covering material 53 starts expanding due to a downward force from the weight of the covering material 53 and the bottom rail 52, the driving module 56 is driven to rotate, whereby the threaded rod 55*a* and the one-way clutch 57 rotates simultaneously with the driving module 56, wherein the one-way clutch 57 engaged to the rotatable unit 55*c*1 of the damper 55*c* such that the rotatable unit 55*c*1 is driven to rotate with the one-way clutch 57. At the same time, the pivot latch 55*d* is not urged to pivot such that the latch part 55*d*1 at the first position P1 engages to the gear 55*c*2*a* to restrict the cover 55*c*2 from rotating. Therefore, the damper 55*c* outputs a resistance such that a rotating speed of the rotatable unit 55*c*1 is decreased due to the resistance when the rotatable unit 55*c*1 rotates. In addition, the one-way clutch 57, the threaded rod 55*a*, and the driving module 56 are configured to rotate simultaneously with the rotatable unit 55*c*1, and thus rotating speed of the one-way clutch 57, the threaded rod 55*a*, and the driving module 56 are decreased due to the resistance. The damper 55*c* provides the resistance to provide a damping effect.

While the covering material 53 is expanding, the threaded rod 55*a* is driven by the driving structure 56 to rotate, and thus the nut 55*b* moves along the axial direction of the threaded rod 55*a* toward the pivot latch 55*d*. When the nut 55*b* engages one end of the linking unit 55*e*, the linking unit 55*e* is urged to pivot, and therefore the other end of the linking unit 55*e* abuts the blocking part 55*d*2 of the pivot latch 55*d* to pivot the pivot latch 55*d*. Thus, the latch part 55*d*1 disengages from the gear 55*c*2*a* such that the latch part 55*d*1 moves from the first position P1 to the second position P2. As the nut 55*b* moving toward the pivot latch 55*d*, the linking unit 55*e* pivots more such that the latch part 55*d*1 is pivoted more, and hence the latch part 55*d*1 continues moving away from the gear 55*c*2*a*. The cover 55*c*2 can rotate freely when the latch part 55*d*1 reaches the second position P2, and thus the cover 55*c*2 is driven by the rotatable unit 55*c*1 to rotate simultaneously, whereby the damper 55*c* is driven to rotate but not outputting the resistance, and hence no damping effect is provided. The rotating speed of the rotatable unit 55*c*1, the one-way clutch 57, the threaded rod 55*a* and the driving module 56 are not interfered by the resistance such that the covering material 53 expands completely with a usual speed.

Furthermore, when the cordloop 54*a* of the operation module 54 is operated to drive the driving module 56 to rotate for collecting the covering material 53, the driving module 56 drives the threaded rod 55*a* to rotate simultaneously. At the same time, the one-way clutch 57 disengages from the rotatable unit 55*c*1 of the damper 55*c* due to the collection of the covering material 53, whereby the one-way clutch 57 rotates freely relative to the rotatable unit 55*c*1 such that the damper 55*c* is not driven to output the resistance. When the threaded rod 55*a* rotates, the nut 55*b* moves along the axial direction of the threaded rod 55*a* away from the pivot latch 55*d* such that the linking unit 55*e* is not urged to pivot the pivot latch 55*d*, and thus the pivot latch 55*d* is urged by gravity due to the eccentric pivot of the pivot latch 55 or by the recovery force from the elastic unit 55*d*3. Therefore, the latch part 55*d*1 moves from the second position P2 toward the first position P1 until the nut 55*b* disengages from the linking unit 55*e*, whereby the latch part 55*d*1 reaches the first position P1 and engages to the gear 55*c*2*a* for restricting the cover 55*c*2 from rotation.

In one embodiment of the present disclosure, when a cellular cover is completely collected, the downward force comprises not only the weight of the bottom rail 52 but also the weight of the covering material 53 collected on the bottom rail 52, and thus maximum downward force is achieved. When the covering material 53 starts expand, the rotating speed of the driving module 56 increases rapidly by the maximum downward force so as to expand the covering material 53 rapidly. At this time, the resistance outputted by the damper 55*c* is required to decrease the rotating speed of the covering material 53. As the covering material 53 is expanding gradually, the covering material 53 collected on the bottom rail 52 is gradually decreased, therefore the downward force decreases, as well as the rotating speed of the driving module 56 is decreased. Therefore, outputting of the resistance can be stopped to maintain the rotating speed of the driving module 56 when the covering material 53 expands to a specific length.

It will be apparent to those skilled in the art that the present disclosure is not limited to the details of the foregoing exemplary embodiments, and that the disclosure may be realized in any other specific forms without departing from the spirit or essential characteristics of the present disclosure. Therefore, all the aforementioned embodiments should only be considered as illustrative and not restrictive in all aspects. The scope of the disclosure is defined by the claims rather than by the foregoing descriptions, and therefore the scope of the disclosure is intended to cover any changes within equivalent meaning and range thereof. Any numbering in the claims shall not be construed as limiting the claims. Furthermore, "comprise" does not exclude other elements or steps, and the singular does not exclude a plurality. The plurality of units or means recited in the system claims may also be realized by software or hardware from a unit or device.

What is claimed is:

1. A displacement controlling device, comprising:
   a shaft having a displacement region;
   a movable unit connected to the shaft and configured to move within the displacement region;
   a damper connected to one end of the shaft; and
   a restraint unit arranged between the movable unit and the damper, wherein the restraint unit is configured to be moved by the movable unit from a first position to a second position when the movable unit approaches the damper; the restraint unit returns to the first position from the second position when the movable unit moves away from the damper;
   wherein, when the restraint unit is at the first position, the restraint unit restricts the damper, and the damper outputs a resistance as a result of being restricted by the restraint unit;
   and wherein, when the restraint unit is at the second position, the damper is not restricted by the restraint unit and therefore stops outputting the resistance.

2. The displacement controlling device of claim 1, wherein the shaft is a long rod body, and the movable unit is sleeved over the long rod body, wherein the movable unit is configured to move along an axial direction of the long rod body.

3. The displacement controlling device of claim 2, wherein the long rod body is a threaded rod and the movable unit is a nut.

4. The displacement controlling device of claim 1, wherein the damper comprises a cover and a rotatable unit in the cover; the rotatable unit is configured to rotate relative to the cover when the restraint unit is at the first position; the rotatable unit and the cover are configured to rotate simultaneously when the restraint unit is at the second position.

5. The displacement controlling device of claim 4, wherein the restraint unit is a coil spring around an external surface of the shaft, one end of the coil spring is a fixed end fixed to the cover, and another end of the coil spring is a free end, the coil spring is sleeved over the shaft for restricting the cover from rotating, whereby the damper is configured to output the resistance when the free end of the coil spring is at the first position.

6. The displacement controlling device of claim 5, wherein the free end is configured to move toward the fixed end when the free end is driven from the first position toward the second position, and the damper is configured to stop outputting the resistance when the free end is at the second position such that a diameter of the coil spring is larger than a diameter of the shaft and the cover is rotatable.

7. The displacement controlling device of claim 4, wherein the cover has a gear corresponding to the restraint unit such that the restraint unit is configured to engage to the gear.

8. The displacement controlling device of claim 7, wherein the restraint unit is a pivot latch, wherein one end of the pivot latch adjacent to the gear is a latch part, and the other end of the pivot latch away from the gear is a blocking part; the damper is configured to output the resistance when the latch part engages to the gear at the first position such that the rotatable unit rotates relative to the cover.

9. The displacement controlling device of claim 8, wherein the movable unit is configured to move toward the pivot latch to urge the blocking part for pivoting the pivot latch such that the latch part moves from the first position toward the second position away from the gear, and wherein the damper is configured to stop outputting the resistance when the latch part reaches the second position and disengages from the gear such that the rotatable unit and the cover are configured to rotate simultaneously.

10. The displacement controlling device of claim 8, further comprising a linking unit between the movable unit and the pivot latch, wherein the movable unit is configured to move along the shaft toward the pivot latch for pivoting the linking unit such that one end of the linking unit pivots the pivot latch by urging the blocking part of the pivot latch, whereby the latch part moves from the first position toward the second position away from the gear, and wherein the damper is configured to stop outputting the resistance when the latch part disengages from the gear at the second position such that the rotatable unit and the cover rotate simultaneously.

11. The displacement controlling device of claim 8, wherein a pivot of the pivot latch is eccentric relative to the pivot latch, and the latch part of the pivot latch is at the first position while the pivot latch is not pivoted by the movable unit.

12. The displacement controlling device of claim 8, wherein the pivot latch comprises an elastic unit which provides a recovery force for urging the latch part toward the first position constantly, and the latch part of the pivot latch is at the first position while the pivot latch is not pivoted by the movable unit.

13. The displacement controlling device of claim 7, wherein the restraint unit is a latch connected to the shaft and adjacent the gear, wherein one end of the latch is radially away from an axis of the shaft when the latch is at the first position, and wherein the latch is protruding from an external surface of the shaft and for engaging to the gear, whereby the damper outputs the resistance.

14. The displacement controlling device of claim 13, wherein the movable unit is configured to move to operate the latch from the first position toward the second position such that the latch is urged radially inward relative to the axis of the shaft, whereby the latch disengaged from the gear such that the damper stops outputting the resistance when the latch reaches the second position.

* * * * *